United States Patent
Minamitani et al.

(10) Patent No.: US 8,510,674 B2
(45) Date of Patent: Aug. 13, 2013

(54) VEHICULAR MANIPULATION INPUT APPARATUS

(75) Inventors: Yasuo Minamitani, Kariya (JP); Shinsuke Hisatsugu, Kariya (JP)

(73) Assignee: Denso Corporation, Kariya (JP)

( * ) Notice: Subject to any disclaimer, the term of this patent is extended or adjusted under 35 U.S.C. 154(b) by 133 days.

(21) Appl. No.: 13/134,520

(22) Filed: Jun. 9, 2011

(65) Prior Publication Data
US 2011/0307824 A1 Dec. 15, 2011

(30) Foreign Application Priority Data
Jun. 11, 2010 (JP) ................................. 2010-134012

(51) Int. Cl.
G06F 3/048 (2013.01)
G06F 7/00 (2006.01)

(52) U.S. Cl.
USPC ............................................ 715/781; 701/36

(58) Field of Classification Search
USPC ........................................................ 715/781
See application file for complete search history.

(56) References Cited

U.S. PATENT DOCUMENTS

| | | | |
|---|---|---|---|
| 6,650,345 B1 * | 11/2003 | Saito et al. ..................... | 715/764 |
| 2004/0020704 A1 * | 2/2004 | Sunda et al. .................. | 180/315 |
| 2007/0069914 A1 * | 3/2007 | Lenneman et al. ......... | 340/691.6 |
| 2009/0183978 A1 | 7/2009 | Asada | |
| 2009/0259357 A1 | 10/2009 | Aoki | |
| 2010/0270133 A1 * | 10/2010 | Baker ................................ | 200/4 |

FOREIGN PATENT DOCUMENTS

| | | | |
|---|---|---|---|
| JP | 8-123614 | | 5/1996 |
| JP | 9-274826 | | 10/1997 |
| JP | 09274826 A | * | 10/1997 |
| JP | 10-50178 | | 2/1998 |
| JP | 2000-355256 | | 12/2000 |
| JP | 2003-308760 | | 10/2003 |
| JP | 2003308760 A | * | 10/2003 |
| JP | 2004-252760 | | 9/2004 |
| JP | 2004-279095 | | 10/2004 |
| JP | 2009-176432 | | 8/2009 |
| JP | 2009-255609 | | 11/2009 |

OTHER PUBLICATIONS

Office action dated Jun. 14, 2012 in corresponding Japanese Application No. 2010-134012.
Office action dated Jan. 31, 2013 in corresponding Chinese Application No. 2011 10163267.9.

* cited by examiner

Primary Examiner — Kyle Stork
Assistant Examiner — Xuyang Xia
(74) Attorney, Agent, or Firm — Harness, Dickey & Pierce, PLC

(57) ABSTRACT

A vehicular manipulation input apparatus includes a display device and a remote manipulation device. A manipulation to a manipulation member of the manipulation device is enabled by several manipulation manners. One of the several manipulation manners is designated as a valid manipulation manner in the manipulation device according to a window displayed on a screen of the display device. The designated valid manipulation manner is suggested by not only a display on the screen of the display device, but also an ornament display portion arranged around the manipulation member of the manipulation device.

9 Claims, 16 Drawing Sheets

VEHICULAR MANIPULATION INPUT APPARATUS

CROSS REFERENCE TO RELATED APPLICATION

The present application is based on and incorporates herein by reference Japanese Patent Application No. 2010-134012 filed on Jun. 11, 2010.

FIELD OF THE INVENTION

The present invention relates to a vehicular manipulation input apparatus in which a manipulation input is performed using a display.

BACKGROUND OF THE INVENTION

[Patent document 1] JP-2004-252760 A
    [Patent document 2] JP-2009-176432 A (US 2009/0183978 A1)

In recent vehicles, there is existing an input apparatus including (i) a display device located in front of a driver and (ii) a remote manipulation device located separate from the display device. The display device has a screen containing several selection regions (command switches). A manipulation of the remote manipulation device enables a selection of one of the several selection regions using a cursor or pointer and a determination input to the selected region (Patent document 1). In such a manipulation input apparatus, the remote manipulation device may be arranged preferably in a position within reach of a hand of the driver such as a side of the driver's seat. For example, for the driver to perform a touch typing without seeing switches or the like, it is possible for the driver to manipulate while maintaining a posture for driving operation, thus providing an advantage in usability.

In contrast, a recent in-vehicle instrument provides varieties of functions. To use those functions efficiently, there is adopted a composite manipulation device. The composite manipulation device realizes several manipulation manners such as a rotating manipulation manner, a tilting manipulation manner, a two-dimensional sliding manipulation manner, and a pushing manipulation manner collectively in a single device body. For instance, one of the manipulation manners is used to select one of the several selection regions (command switches) drawn on the screen. Then, another manipulation manner is used to execute a parameter change associated with the selected selection region. Various manipulations for setup or execution are available for the varieties of functions (Patent document 2).

When adopting such a composite manipulation device, the following becomes a problem to be solved. That is, it is not easy to intuitively recognize an association between a display on the screen and a manipulation manner in the composite manipulation device. For instance, the screen may contain four manipulation images (i.e., four selection regions), which are located respectively in a right upper portion, a left upper portion, a left lower portion, and a right lower portion, with respect to a center of the screen. In other words, four manipulation images are located with respect to the center of the screen, in a circular order (hereinafter, referred to as a crisscross/circular arrangement). Such a crisscross/circular arrangement of the manipulation images may cause a user to recognize either a tilting manipulation manner from the crisscross arrangement, or a rotating manipulation manner from the circular arrangement. This makes it difficult for the user to use which of the two manipulation manners to select a manipulation image. In contrast, even if seeing the composite manipulation device, there is no teaching which of the two manipulation manners to select a manipulation image. As a result, the user may be confused in selecting a suitable manipulation manner, posing a problem in usability.

SUMMARY OF THE INVENTION

It is an object of the present invention to provide a vehicular manipulation input apparatus including a composite manipulation device enabling several manipulation manners while enabling an intuitive determination of a currently valid manipulation manner to help prevent a mis-manipulation.

To achieve the above object, according to an example of the present invention, a vehicular manipulation input apparatus in a vehicle is provided as follows. A display device is included to display a window on a screen. A composite manipulation device is included to contain a manipulation member, to which a manipulation is enabled by a first manipulation manner and a second manipulation manner, the first manipulation manner being different from the second manipulation manner in respect of a manipulation direction, the manipulation to the manipulation member enabling a remote manipulation input to the window displayed on the screen of the display device. A manipulation manner designation section is included to designate a valid manipulation manner that is one of the first manipulation manner and the second manipulation manner, whichever is in a valid state in the composite manipulation device according to the window on the screen of the display device. A manipulation manner display portion is included to be arranged in at least one of the manipulation member and a periphery of the manipulation member, the manipulation manner display portion containing a first display portion that suggests the first manipulation manner and a second display portion that suggests the second manipulation manner. A primary display control section is included to cause the display device to execute a display that suggests the valid manipulation manner. An auxiliary display control section is included to highlight, in display, one of the first display portion and the second display portion, whichever corresponds to the valid manipulation manner designated by the manipulation manner designation section, more than an other of the first display portion and the second display portion, whichever does not correspond to the valid manipulation manner designated by the manipulation manner designation section.

Under the above configuration, with respect to the several manipulation manners applicable to the manipulation to the manipulation member of the composite manipulation device, the currently valid manipulation manner can be suggested or associated by both a screen display (GUI) on the screen of the display device and a display portion (manipulation manner display portion, or an auxiliary display portion) arranged at a periphery of the manipulation member. That is, the screen display in the display device and the auxiliary display in the composite manipulation device cooperate with each other in suggesting the valid manipulation manner, enabling the user to intuitively recognize the valid manipulation manner. Furthermore, while looking at the screen to thereby recognize the manipulation manner from a display content, the user looks at the manipulation member in actually manipulating the manipulation member to thereby see a manipulation direction of the manipulation manner displayed, enabling easy recognition in the manipulation direction to be intended and easy execution of the intended manipulation. Thus, the configuration excels in usability.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereinafter, a vehicular manipulation apparatus according to an embodiment of the present invention is described with reference to the drawings.

Figure 1:
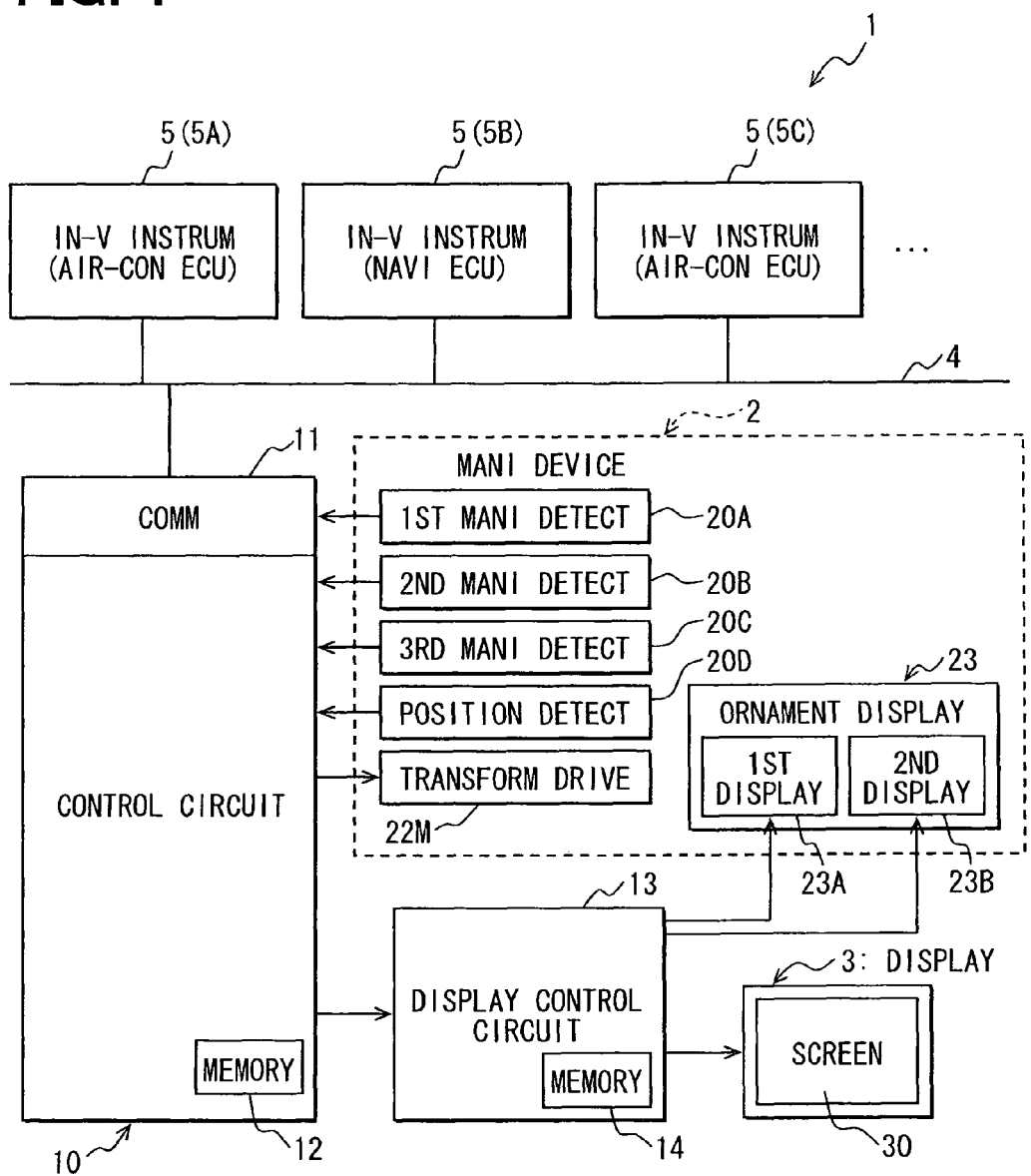
FIG. 1 is a block diagram illustrating a configuration of a vehicular manipulation input apparatus according to an embodiment of the present invention.

FIG. 1 is a block diagram illustrating a schematic configuration of a vehicular manipulation input apparatus according to an embodiment of the present invention. The vehicular manipulation input apparatus 1 is mounted in a subject vehicle. As shown in FIG. 1, the vehicle manipulation input apparatus 1 includes a display device 3, a display control circuit 13, a control circuit 10, and a manipulation device 2. The display control circuit 13, which may be referred to as a primary display control section or means, displays a selection-use window 300 with several selection regions (input images) on a screen 30 of the display device 3 (see FIG. 2). The manipulation device 2, which may be referred to as a composite manipulation device or a manipulation means, enables a remote selection manipulation to select one of several selection regions 3I in the displayed selection-use window 300 and perform a determination input to the selected selection region 3I. The control circuit 10 outputs a control instruction based on a manipulation of the manipulation device 2 to an external in-vehicle instrument 5 to execute a function of the instrument 5 according to the manipulation, while outputting a display instruction based on a manipulation of the manipulation device 2 to the display control circuit 13 to execute a display switchover according to the manipulation.

The display device 3 can use a well-known liquid crystal display, for instance. The display device 3 is connected to the display control circuit 13 to perform a window display on the screen 30 based on image information outputted from the display control circuit 13.

The display control circuit 13 contains a storage portion (memory) 14. The display control circuit 13 stores in the storage portion 14 an image information storage area (image information storage portion) which stores image information in association with various windows displayed on the screen 30. Such image information may be stored in an external storage device (unshown) that is connected with the display control circuit 13. When receiving a display switchover instruction signal from the control circuit 10, the display control circuit 13 reads out the image information corresponding to the display switchover instruction signal to switch a display content on the screen 30. It is noted that the image information storage area stores image information with respect to each of several windows to be displayed. For example, the image information for displaying the above-mentioned selection-use window 300 contains, in association with each window, background image information for displaying a background image 3B, input image information for superimposing several input images on the background image 3B, auxiliary image information for displaying an auxiliary image 3D indicating visually a manipulation manner, which is designated so as to enable an input in the selection-use window 300, and information for displaying another necessary image (image information such as a cursor or point, and a display technique).

Figure 2:
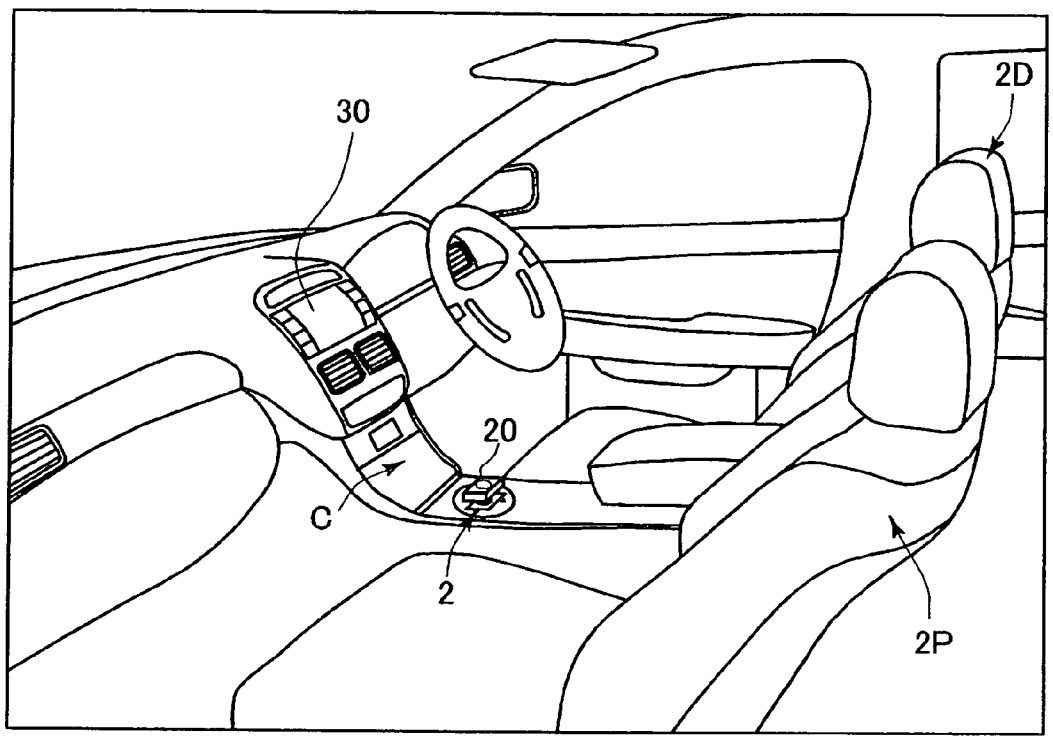
FIG. 2 is an oblique perspective view of a vehicle compartment accommodating the manipulation input apparatus according to the present embodiment.

The manipulation device 2 is configured as a composite manipulation device 2 (composite manipulation means) to enable each of several manipulation manners to independently achieve a corresponding manipulation. The manipulation device 2 of the present embodiment includes a single manipulation member 20 that is manipulated by a user. The manipulation member 20 enables a first manipulation manner with a first manipulation direction and a second manipulation manner with a second manipulation direction different from the first manipulation direction. Further, as illustrated in FIG. 2, the manipulation device 2 is arranged at a position different or separate from the screen 30 of the display device 3. The manipulation device 2 serves as a remote manipulation device performing a remote manipulation input to a display content in a window appearing on the screen 30, enabling through a remote manipulation a selection/determination input to a selection region (input image) 3I displayed on the screen 30.

Figure 3A:
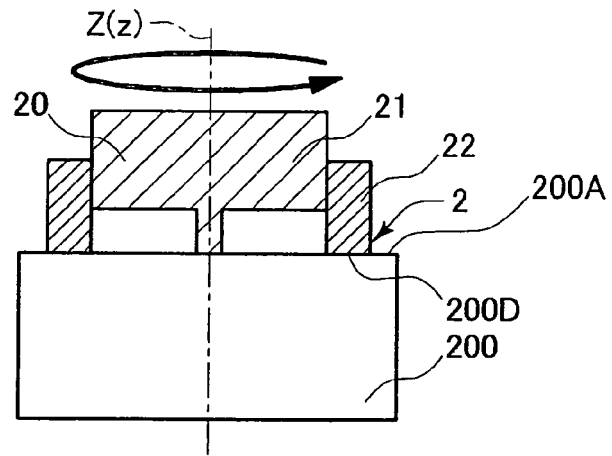
FIG. 3A is a diagram for explaining a first manipulation manner.
Figure 3B:
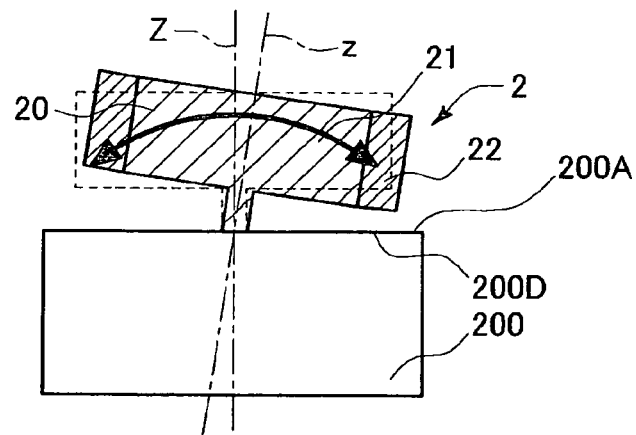
FIG. 3B is a diagram for explaining a second manipulation manner.

The first manipulation manner in the manipulation device 2 of the present embodiment is a rotating manipulation manner in which the manipulation member 20 is rotated around a predetermined rotation axis z, as illustrated in FIG. 3A. The second manipulation manner is a transferring manipulation manner in which the manipulation member 20 is transferred in a direction orthogonal to a reference axis from a reference position where a specified axis (here, the above rotation axis z) accords with a predetermined reference axis Z, as illustrated in FIG. 3B. In the present embodiment, each of those manipulation manners enables a selection manipulation which selects one of the selection regions (input images) 3I displayed on the screen 30.

Figure 3C:
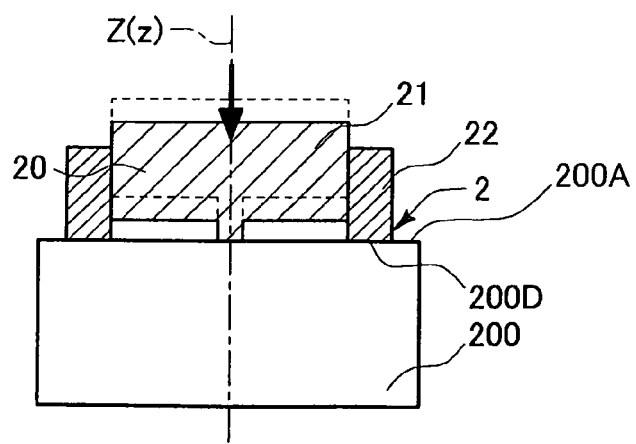
FIG. 3C is a diagram for explaining a third manipulation manner.

In addition, the manipulation device 2 of the present embodiment further enables a third manipulation manner that is a pressing manipulation manner (or a pushing manipulation manner) in which the manipulation member 20 is pressed in line with the reference axis Z, as illustrated in FIG. 3C. The pressing manipulation manner as the third manipulation manner enables a determination input which performs or applies a determination input to the selection region (input image) 3I selected by either the first manipulation manner or the second manipulation manner.

According to the present embodiment, the manipulation (referred to as a transferring manipulation) by the transferring manipulation manner is defined as a manipulation to transfer the manipulation member 20 from a predetermined reference position in one of predetermined specific transferring manipulation directions. Here, the transferring manipulation of the manipulation member 20 is guided so as to be permitted only in one of those predetermined specific transferring manipulation directions. The transferring manipulation includes a crisscross direction manipulation, in which the manipulation member 20 can be transferred in four crisscross directions from the reference position. It is noted that the transferring manipulation according to the present embodiment only needs to be designed such that the manipulation member 20 transfers in a direction orthogonal to the reference axis Z. The transferring manipulation may be designed such that the manipulation member 20 is transferred in a state that the specified axis z is in parallel with the reference axis Z. In the present embodiment, the transferring manipulation is explained as a tilting manipulation in which the specified axis z is tilted from the reference position where the rotation axis z accords with the reference axis Z, transferring the manipulation member 20 in a direction orthogonal to the reference axis Z. Thus, the transferring manipulation may be referred to as a tilting manipulation in the present embodiment. Further, the transferring manipulation may be referred to as a linear motion manipulation that is clearly differentiated from the rotating manipulation of the first manipulation manner.

In addition, in the manipulation device 2 of the present embodiment, the transferring manipulation direction includes four directions of vehicle forth and back directions, and vehicle left and right directions. The vehicle forth and back directions correspond to up and down directions, respectively, on the screen 30 in the display device 3; the vehicle left and right directions correspond to left and right directions, respectively, on the screen 30 in the display device 3.

The manipulation device 2 contains a housing 200 that includes a first manipulation detection portion 20A which detects a manipulation of the first manipulation manner to the manipulation member 20, a second manipulation detection section 20B which detects a manipulation of the second manipulation manner to the manipulation member 20, and a third manipulation detection section 20C which detects a manipulation of the third manipulation manner to the manipulation member 20. In addition, the manipulation device 2 further includes a biasing portion or means (e.g., a spring member (unshown)), and a reactive force portion or means (e.g., a reactive force motor (unshown)) so as to maintain the manipulation member 20 in the reference position (neutral position).

Figure 4A:
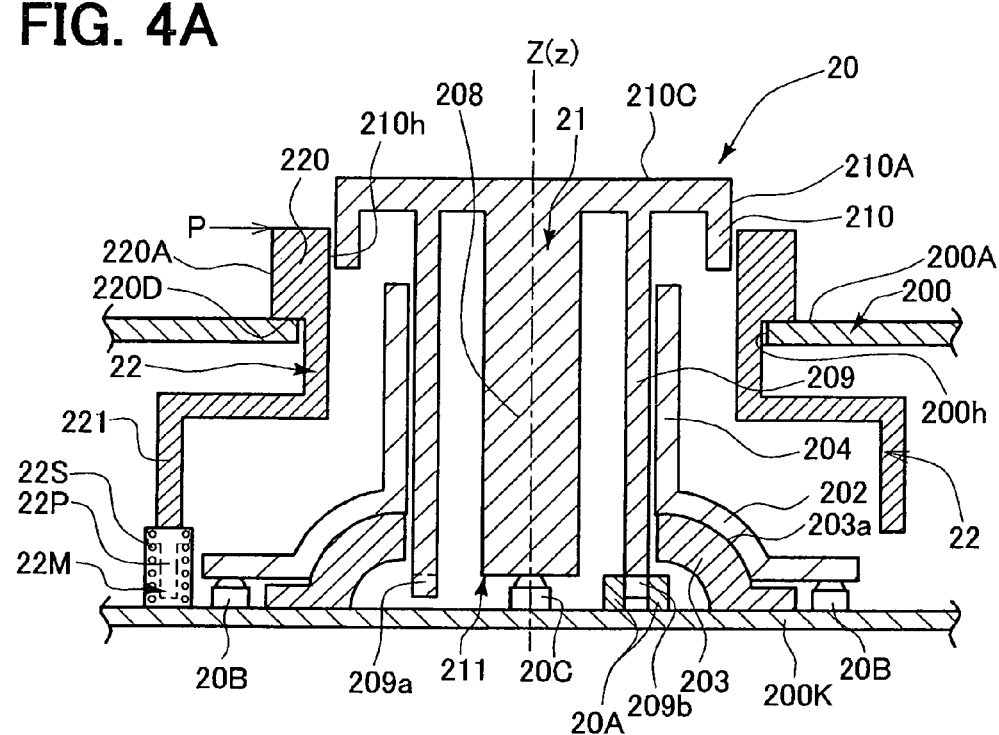
FIG. 4A is a diagram illustrating a central cross-section of a manipulation device in which a transformable portion is in a first state.
Figure 4B:
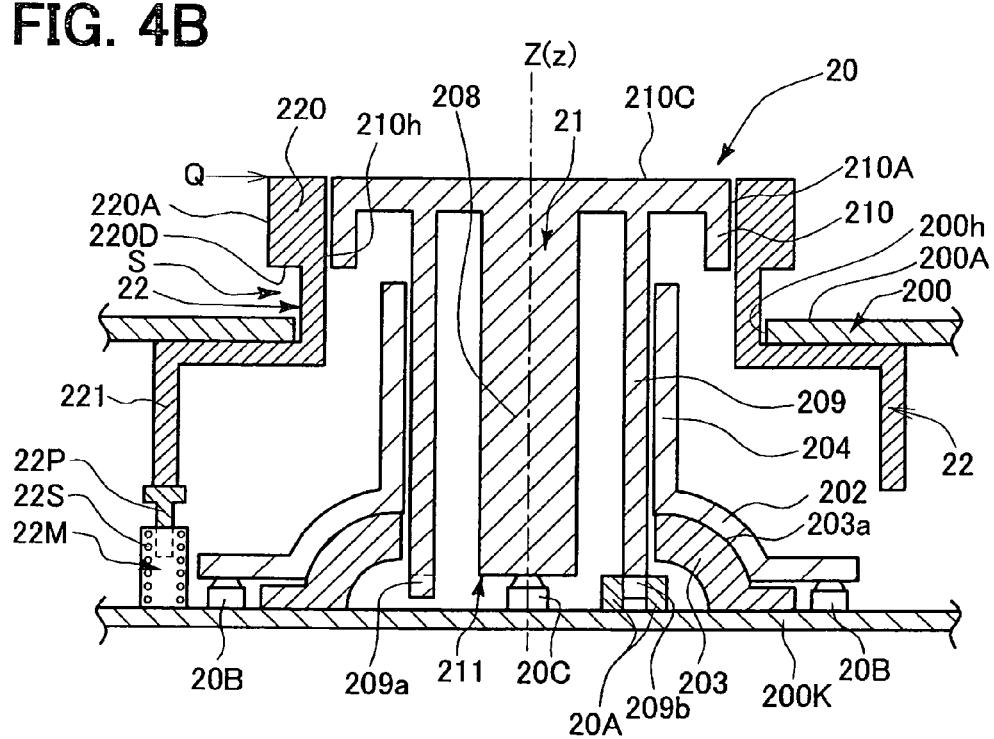
FIG. 4B is a diagram illustrating a central cross-section of a manipulation device in which a transformable portion is in a second state.

The manipulation member 20 of the manipulation device 2 has a main body portion 21 and a transformable portion 22. With reference to FIGS. 4A, 4B, the transformable portion 22 is transformed between a predetermined first state and a predetermined second state. When the transformable portion 22 is in the first state, a manipulation of the first manipulation manner is permitted while a manipulation of the second manipulation manner is restricted. In contrast, when the transformable portion 22 is in the second state, a manipulation of the second manipulation manner is permitted while a manipulation of the first manipulation manner is restricted. The manipulation device 2 further includes a transformation drive portion 22M in the housing 200 for driving a transformation of the transformable portion 22.

The transformation drive portion 22M of the present embodiment is a a reciprocation means to cause the transformable portion 22 to perform a reciprocation movement between the first state and the second state. The transformation drive section 22M may be driven by a motor or a solenoid. The transformable portion 22 is connected to a drive pin (core member) 22P performing a reciprocation movement due to an electric current application change to a solenoid coil 22S. The transformable portion 22 is in conjunction with the movement of the drive pin 22P so as to reciprocally move between a first position P (the first state) and a second position Q (the second state). When using the motor, the rotation output of the motor is converted into a linear movement via a deceleration mechanism and transmitted to the transformable portion 22, causing the transformable portion 22 to perform a reciprocation movement.

An internal structure of the manipulation device 2 will be explained brieflt using a sectional view illustrating in FIG. 4A and FIG. 4B.

In the manipulation device 2, the manipulation member 20 (i.e., the main body portion 21 and the transformable portion 22) protrudes towards an outside of the housing 200 from a hole portion (opening) 200h that penetrates inside of the housing 200. Such a protrusion direction accords with an extension direction (a rotation axis direction) of the rotation axis z, along which a rotating manipulation by the rotating manipulation manner is enabled for the main body portion 21 in the case that the transformable portion 22 is at an exposure position P (to be explained later). The main body portion 21 includes a protruding tip portion 210 having a protruding tip face 210C to which a pressing manipulation (the third manipulation manner) is applied by a user, and an outer circumference face 210A to which a rotating manipulation manner (the first manipulation manner) is applied by a user. A shaft portion 211 is extended downward (towards an internal portion of the housing 200) from the protruding tip portion 210. The shaft portion 211 is inserted in the internal portion of the housing 200 via the hole portion 200h (opening) provided in an upper portion of the housing 200. The housing 200 accommodates a sphere portion 202 formed in the shaft portion 211. The sphere portion 202 is supported slidably by an outer face 203a of a sphere-shaped reception portion 203 (i.e., holder) fixed in the housing 200; thus, the shaft portion 211 is supported slidably with respect to the housing 200. Further, a guide portion (unshown) is provided in the housing 200 so as to limit the slide (or tilt) direction to the predetermined transferring manipulation directions; thus, the transferring or tilting manipulation to the transferring manipulation directions is enabled.

A substrate 200K is fixed in the housing 200. On the substrate 200K, three manipulation detection portions are arranged. The first manipulation detection portion 20A detects a rotation direction and a rotation amount of the main body portion 21 using a concavo-convex 209b, 209a arranged consecutively in a hoop direction formed in a lower end portion of the shaft portion 211 (outer shaft portion 209) of the main body portion 21. The second manipulation detection portion 20B detects a presence or absence of a tilting manipulation of the main body portion 21 (and the transformable portion). The third manipulation detection portion 20C detects a presence or absence of a pressing manipulation of the main body portion 21. Those manipulation detection portions 20A, 20B, 20C are connected with the control circuit 10 via the substrate 200K. The first manipulation detection portion 20A serving as a rotating manipulation detection portion can be a well-known optical sensor having a light emitting portion and a light receiving portion. When the cylindrical outer shaft portion 209 rotates, the light of the light emitting portion transmits through a concave portion and is shut down by the convex portion. To that end, the light emitting portion and the light receiving portion are arranged at an inner portion and at an outer portion, respectively, in a lower end portion of the outer shaft portion 209; the switchover of the light reception state of the light receiving portion is detected. The second manipulation detection portion 20B serving as the tilting manipulation detection portion (transferring manipulation detection portion) is a tact switch which is pressed and biased by the sphere portion 202 tilting integrally together with the main body portion 21 in conjunction with a tilting manipulation to the main body portion 21. The third manipulation detection portion 20C serving as a pressing manipulation detection portion is a tact switch which is pressed and biased downward by the shaft portion 211 (inner shaft portion 208) in conjunction with a press manipulation in the reference axis Z to the main body portion 21.

Further, the transformable portion 22 of the manipulation member 20 permits the relative rotation around the rotation axis z of the main body portion 21, whereas the transformable portion 22 itself is provided to be fixed (in non rotation) with respect to the housing 200. This transformable portion 22 can move reciprocally between the concealment position Q (FIG. 4B) and the exposure position P (FIG. 4A). The concealment position Q (FIG. 4B) enables concealment to surround a cylindrical portion of the protruding tip portion 210 of the main body portion 21 to thereby conceal from an outer circumference side an outer circumference face 210A. The exposure position P (FIG. 4A) enables exposure to move towards the housing 200 to expose the outer circumference face 210A of the cylindrical portion of the protruding tip portion 210. When the transformable portion 22 is located in the concealment position Q, a spacing S or gap is provided between the front face 200A of the housing 200 and the transformable portion 22; thereby, the manipulation member 20 is permitted to tilt. When the transformable portion 22 is located at the exposure position P, a contact portion 220 is in contact with the front face 200A of the housing 200; the contact thereby restricts tilting of the manipulation member 20.

The transformable portion 22 in the present embodiment has a cylindrical shape to cover the main body portion 21 from an outside with respect to the specified axis z. The transformable portion 22 includes a cylindrical tip portion (upper contact portion) 220 and a cylindrical shaft portion 221. The cylindrical tip portion 220 is shaped of a pipe to surround from an outside the main body portion 21 being cylindrical at the concealment position Q; the outer circumference face 220A of the cylindrical tip portion 220 serves as a grip or support portion when the tilting manipulation (transferring manipulation) is applied. The cylindrical shaft portion 221 is extended from the cylindrical tip portion 220 downward (towards an inner portion of the housing 200) and is inserted in an internal portion of the housing 200 via the hole portion 200h (opening) provided in an upper portion of the housing 200. The cylindrical tip portion 220 has a fitting hole (also referred to as a fitting hole portion) 210h in a central portion. At the concealment position Q, the main body portion 21 being cylindrical is fitted in the fitting hole 210h such that all the face except the circular tip face 210C (including the outer circumference face 210A) is not exposed. In contrast, the cylindrical shaft portion 221 is prolonged towards the substrate 200K so as to cover from an upper portion the sphere portion 202 and the sphere reception portion 203 (holder) of the main body portion 21. A lower end of the cylindrical shaft portion 221 is connected integrally with the drive pin (driver) 22P of the transformation drive portion 22M fixed to the substrate 200K. The whole of the transformable portion 22 reciprocally moves up and down in conjunction with the reciprocal up and down movement of the drive pin 22P driven by the transformation drive portion 22M.

When the transformable portion 22 is located at the concealment position Q, the protruding tip portion 210 of the main body portion 21 is fitted in the fitting hole (fitting hole portion) 210h such that only the tip face 210C of the main body portion 21 is exposed. Thereby, only the tip face 210C of the main body portion 21 is exposed; the outer circumference face 210A serving as a grip portion of a user in rotating manipulation is not exposed. Therefore, the user cannot touch the outer circumference face 210A, disabling the rotating manipulation by the user. In contrast, when the transformable portion 22 is located at the exposure position P, the transformable portion 22 is moved back down towards the housing 200. The outer circumference face 210A of the main body portion 21 is exposed; thus, the outer circumference face 210A can be grasped, enabling the rotating manipulation by the user.

In addition, when the transformable portion 22 is located at the exposure position P, the transformable portion 22 is moved back down towards the housing 200 while a lower end face of the cylindrical tip portion 220 is in area to area contact with the front face 200A of the housing 200. The lower end face of the cylindrical tip portion 220 and the front face 200A (front face near the hole portion 200h) of the housing 200 are flat faces that are enabled to form area to area contact. Such area to area contact between the flat faces 200A and 220D prevents a variation in tilting of the manipulation member 20, disabling the tilting manipulation by the user. In contrast, when the transformable portion 22 is located at the concealment position Q, the spacing S or gap arises between the front face 200A of the housing 200 and the lower end face of the cylindrical tip portion 220. There is nothing to prevent the variation in tilting of the manipulation member 20, enabling the tilting manipulation by the user.

In addition, an outer edge of the tip face 220C of the transformable portion 22 has polygonal shape of which sides face the transferring manipulation directions of the manipulation member 20, respectively. Here, the transferring manipulation directions are crisscross; thus, the polygonal shape is a quadrangular shape. Therefore, it is possible to associate the outer edge shape of the transformable portion 22 with a manipulation direction of the second manipulation manner (i.e., the tilting manipulation manner). In addition, the tip face 210C of the main body portion 21 is shaped of a circle orthogonal to the above rotation axis z. Therefore, it is possible to associate the outer edge shape of the main body portion 21 with a manipulation direction of the first manipulation manner (i.e., the rotating manipulation manner). In a state enabling a rotating manipulation, the cylindrical main body portion 21 protrudes from the transformable portion 22, the circular outer edge shape of the tip face 210C of the main body portion 21 is emphasized more. The rotating manipulation manner can be thus associated more easily.

The control circuit 10 includes a known microcomputer containing a CPU, ROM, and RAM. The CPU executes programs stored in an own memory 12 or an external storage device, to thereby achieve the various controls. In addition, the control circuit 10 is connected with control circuits of other in-vehicle instruments 5 using a communication portion 11 via the in-vehicle LAN 4 and is able to exchange data or control signals with them. In addition, the control circuit 10 functions as a control execution means or device to execute a corresponding control, based on a manipulation signal received from the manipulation device 2. For example, according to manipulations applied to the manipulation device 2, the control circuit 10 can achieve various functions of the in-vehicle instruments connected via the in-vehicle LAN 4 such as a vehicle air-conditioning instrument (air-conditioner electronic control unit) 5A, a navigation instrument (navigation electronic control unit) 5B, and a car audio (audio electronic control unit) 5C.

Figure 5:
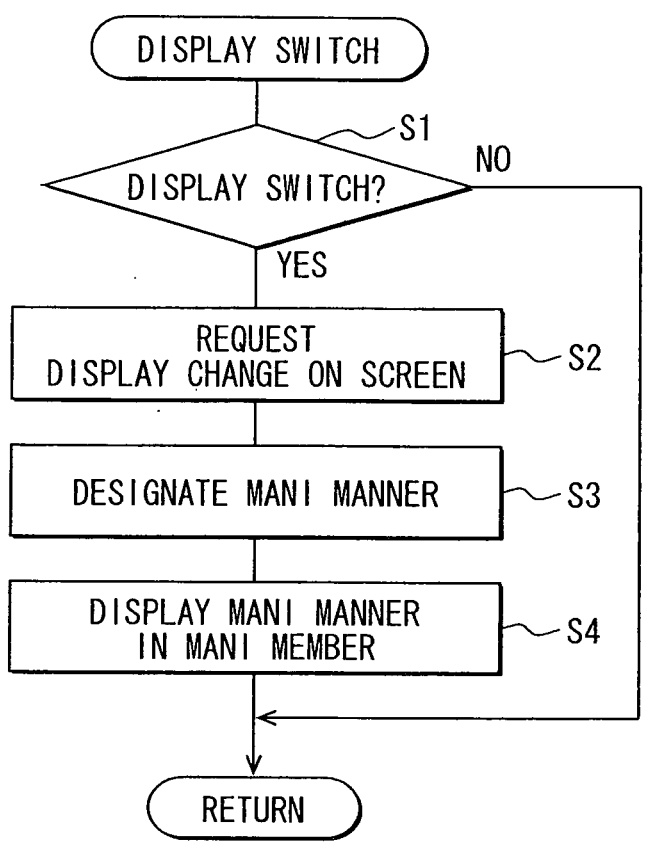
FIG. 5 is a flowchart diagram for explaining a process to display a manipulation manner.

The following explains a manipulation manner display process in a display switchover executed by the control circuit 10 with reference to FIG. 5. It is noted that even after the end of the present process, the present process is repeatedly executed with predetermined intervals.

It is further noted that a flowchart or the processing of the flowchart in the present application includes sections (also referred to as steps), which are represented, for instance, as S1. Further, each section can be divided into several sub-sections while several sections can be combined into a single section. Furthermore, each of thus configured sections can be referred to as a means or module and achieved not only as a software device but also as a hardware device.

When the control circuit 10 receives a display switchover request signal from the manipulation device 2, other manipulation portions, and a control circuit of an external in-vehicle instrument 5 (S1: Yes), the control circuit 10 outputs, to the display control circuit 13, a display switchover instruction signal which causes the display control circuit 13 to execute a display switchover according to the display switchover request signal (S2). The control circuit 10 designates a manipulation manner set as being valid after the display changes over to a new window according to the display switchover request signal. The control circuit 10 sets the designated manipulation manner in a valid state (i.e., designates the specified manipulation manner as a valid manipulation manner) while setting the remaining manipulation manners in an invalid state (i.e., designates the remaining manipulation manner(s) as an invalid manipulation manner) (S3: a manipulation manner designation section or means). The association relation between a window and a manipulation manner in the valid state or in the invalid state is stored in a predetermined storage area in the memory 12 of the control circuit 10. As the window after the display change is specified, the above association relation is read out to set manipulation manners in the valid state or invalid state, respectively. The validity setup and invalidity setup for the manipulation manners may be achieved by validating and invalidating inputs from the manipulation detection portions corresponding to the manipulation manners, respectively. In the present embodiment, the manipulation corresponding to the manipulation manner may be caused to be mechanically possible or impossible. That is, the control circuit 10 executes a drive control of the transformation drive portion 22M, thereby achieving the following. That is, when the valid manipulation manner switches over to the first manipulation manner, the transformable portion 22 is moved to the exposure position P. When the valid manipulation manner switches over to the second manipulation manner, the transformable portion 22 is moved to the concealment position Q. Further, the validating or invalidating of the input signal may be executed along with the drive control of the transformation drive portion 22M. In addition, in the manipulation device 2, an ornament display portion 23 (also referred to as a manipulation manner display portion 23) is arranged in the manipulation member 20 and/or a peripheral of the manipulation member 20. The manipulation manner display portion 23 includes a first display portion 23A and a second display portion 23B. The first display portion 23A is provided to suggest or indicate the first manipulation manner; the second display portion 23B is provided to suggest or indicate the second manipulation manner. When the display changes over to a new window, the control circuit 10 outputs a manipulation member display instruction signal to the display control circuit 23, thereby achieving a highlight display as follows. That is, one of the first display portion 23A and second display portions 23B corresponding to the manipulation manner set in the valid state (i.e., the valid manipulation manner) is highlighted as compared with the other of the first display portion 23A and the second display portion 23B corresponding to the manipulation manner set in the invalid state (i.e., the invalid manipulation manner) (S4: a manipulation member side manipulation manner display control section or means or an auxiliary display control section or means).

Figure 6A:
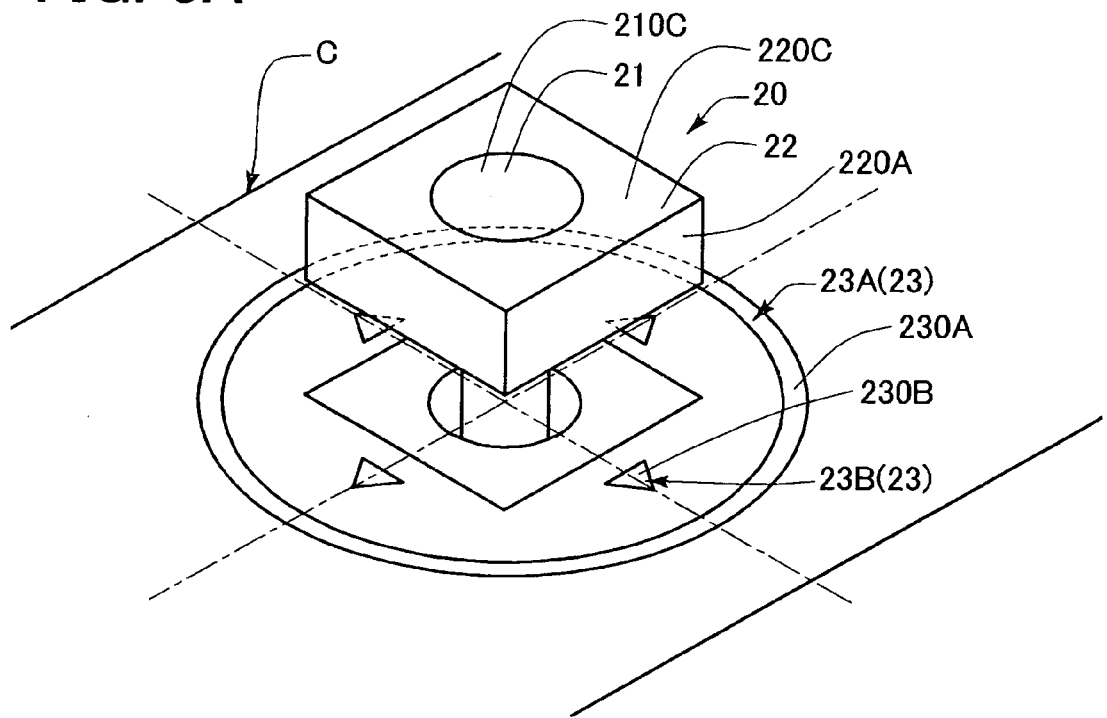
FIG. 6A is an oblique perspective view for explaining a display portion of the manipulation device.
Figure 6B:
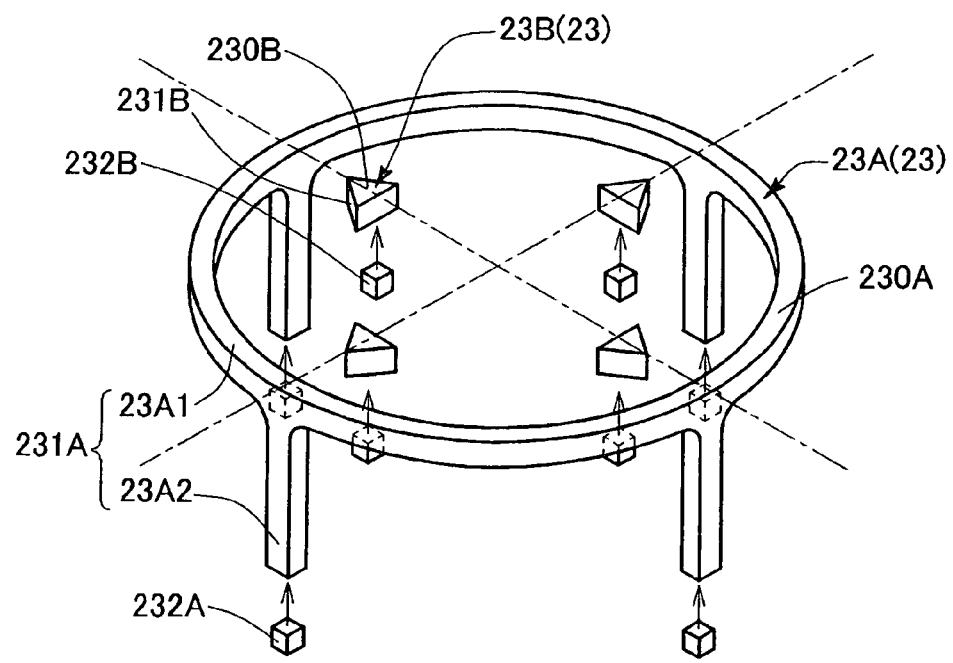
FIG. 6B is a view for explaining a display mechanism in FIG. 6A.

The manipulation manner display portion 23 is an ornament portion of the manipulation device 2, which is formed around the manipulation member 20, as illustrated in FIG. 6A. In the present embodiment, the first display portion 23A is centered on the center of the manipulation member 20 on the front face 200A of the housing 200 to have a shape of a circle so as to indicate the rotating manipulation manner. The second display portion 23B is centered on the center of the manipulation member 20 on the front face 200A of the housing 200 to have a shape of a direction indicator graphic so as to indicate the transferring manipulation manner. In specific, as illustrated in FIG. 6B, the first display portion 23A includes (i) a prism 231A having a circular ring portion 23A1 and a leg portion 23A2 and (ii) light emitting portions 232A (i.e., LED). The circular ring portion 23A1 is shaped of a circle centering on the reference axis Z of the manipulation member 20; the leg portion 23A2 has four legs, each of which is extended downward in each of the transferring manipulation directions. The light emitting portions 232A are located beneath the legs of the leg portion 23A2. Emitting light of a single light emitting portion 232A causes a corresponding leg of the leg portion 23A2 and a part of the front face 230A of the ring portion 23A1 around the corresponding leg to be in a light-emitting state. Emitting light of all the light emitting portions 232A causes all the front face 230A of the ring portion 23A1 to be in a light-emitting state, forming a circular emitting region 230A to suggest or indicate the rotating manipulation manner. In contrast, the second display portion 23B includes prisms 231B and light emitting portions 232B. The prisms 231B are arranged around the reference axis Z of the manipulation member 20 while having graphic shapes (i.e., a triangle to indicate an outside of each of crisscross directions) to indicate transferring manipulation directions, respectively. The light emitting portions 232B are located beneath the prisms 231B, respectively.

Emitting light by the emitting portions 232B causes the corresponding prism 231B to emit light; thereby, the front face 230B of the prism 231B becomes in a light-emitting state to suggest or indicate each transferring manipulation direction. As a result, a light emitting region 23B is formed to indicate the corresponding manipulation manner.

Further, the display control circuit 13 receives the input of the display switchover instruction signal and the manipulation member display instruction signal. The display control circuit 13 thereby executes the highlight display of the manipulation manner display portion 23 corresponding to the inputted manipulation member display instruction signal, and simultaneously executes a display switchover control corresponding to the display switchover instruction signal. The display control circuit 13 switches the display content on the screen 30 to thereby achieve a display to indicate the manipulation manner set in the valid state. Thus, the display control circuit 13 may function as a screen side manipulation manner display control section or means or a primary display control section or means). That is, the display on the screen 30 and ornament display portion 23 in the manipulation member 20 cooperate with each other to perform a display to enable the recognition of the manipulation manner set in the valid state (i.e., the valid manipulation manner).

The following will explain a display to indicate a manipulation manner set in the valid state with reference to FIG. 7A to FIG. 11B.

Each of the windows 301 to 305 in FIG. 7A to FIG. 11A is a selection-use window 300 which contains more than one selection region 3I. In specific, on the screen 30, several predetermined input images are displayed as the selection regions 3I in superimposition on the background image 3B. When the selection manipulation by the manipulation device 2 is made, the cursor 3C is moved to change the display and select one of the selection regions 3I. Furthermore, as the determination input manipulation is made to the selection region 3I selected by the cursor, a control corresponding to the selection region 3I (input image 3C) is executed. For example, when the selection region 3I to which the determination input is made, is a window switchover region to switch the current window to a different window, the display (windows) is changed by the determination input.

Each time the display changes over to each of the window 301 to 305, a manipulation manner of the manipulation device 2 for selecting each selection region 3I (input image) on the selection-use window 300 is designated. To enable the association with the designated manipulation manner, an auxiliary image 3D is displayed by the display control circuit 13 so as to reflect a manipulation movement locus in the corresponding manipulation manner of the manipulation device 2 in superimposition on the above background image 3B. When the selection-use window 300 is thus displayed, the auxiliary image 3D enables the recognition of which manipulation manner of the manipulation device 2 is used for the selection manipulation.

In addition, the control circuit 10 stores, in the own memory 12, manipulation manner specification information associated with the manipulation manner used for the selection manipulation with respect to each of various displays. As the display state of each window is changed, a manipulation manner corresponding to the new display state is designated or set. Further, in the present embodiment, the manipulation manner used for the selection manipulation adopts either the transferring manipulation manner or the rotating manipulation manner. The manipulation manner for making the determination input fixedly adopts the pressing manipulation manner of the third manipulation manner.

Figure 7A:
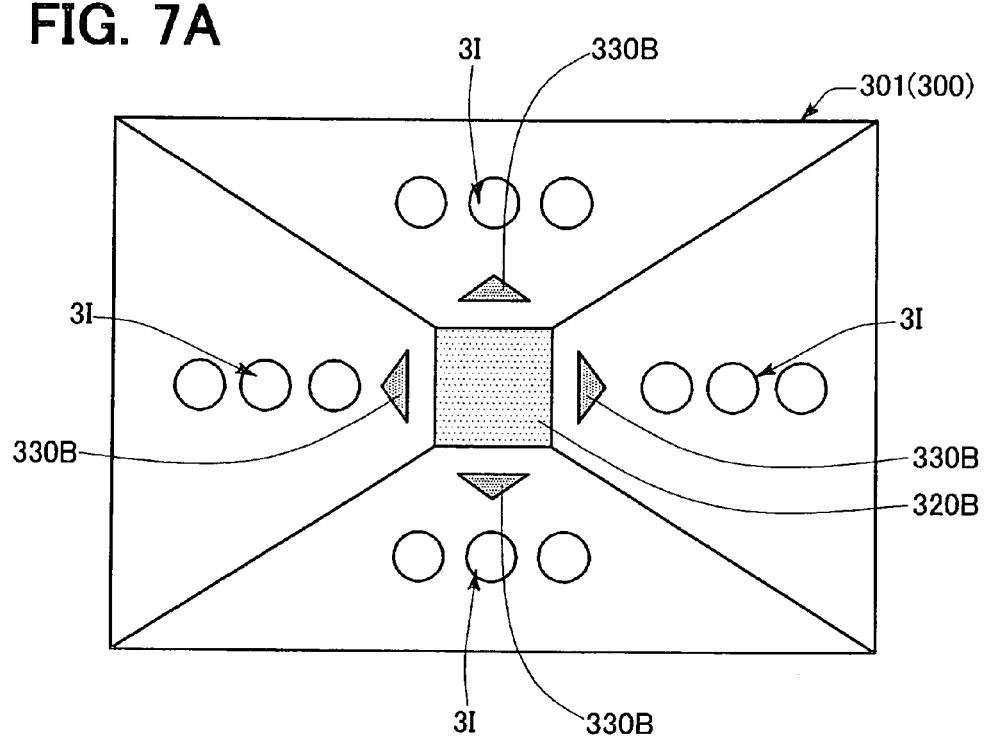
FIG. 7A is a first example of a window in the display device.
Figure 7B:
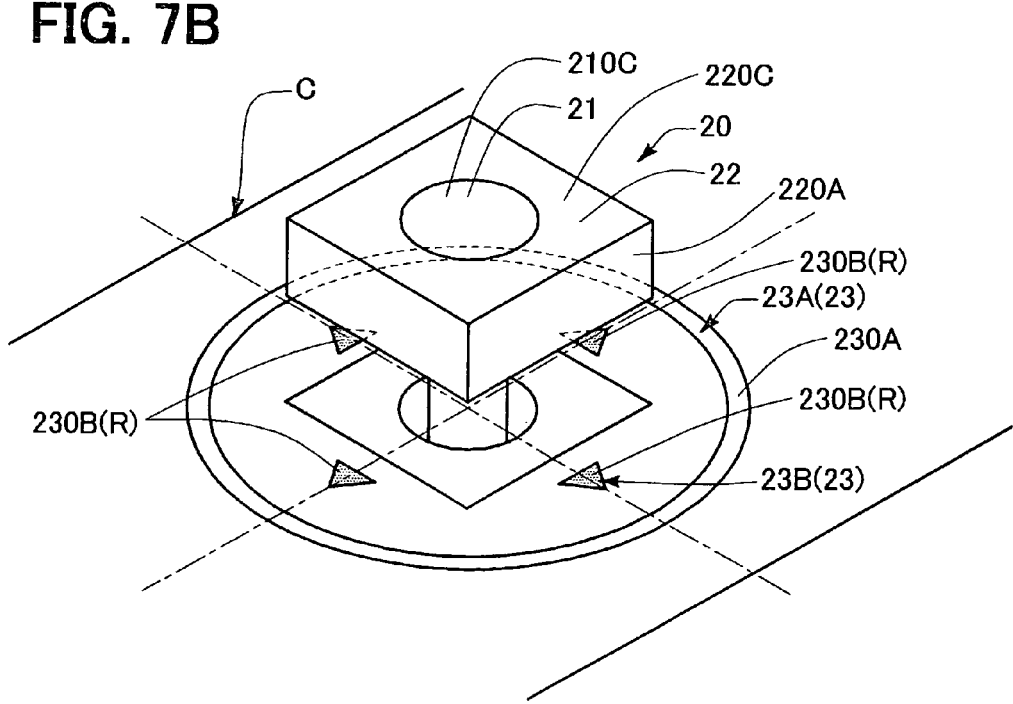
FIG. 7B is an example of a display state in the manipulation device with FIG. 7A displayed.

FIG. 7A shows a display example of the window 301 where the transferring manipulation manner is designated or set up. The selection regions (input images) 3I are arranged in the four directions of the crisscross. Based on the above manipulation manner specification information, the transferring manipulation manner is designated as the valid manipulation manner used for the selection manipulation. In addition, a manipulation direction image 330B is displayed in a central portion of the window so as to illustrate each of the directions of transferring manipulation for selecting the selection regions 3I. By displaying the manipulation direction images 330B, the user can recognize that a manipulation by the transferring manipulation manner is possible, and can further recognize the direction of transferring manipulation. Further, in FIG. 7A, a graphic image 320B (i.e., a quadrilateral image) is displayed in a center of the manipulation direction images 330B to reflect the tip face shape of the manipulation member 20. Thereby, the image 320B is recognized as a model image modeling for the manipulation member 20. Each manipulation direction image 330B displayed around the image 3208 is recognized as a specific manipulation direction of the manipulation member 20. In contrast, FIG. 7B is an oblique perspective view illustrating the manipulation device 2 when the window 301 of FIG. 7A is displayed; the transformable portion 22 is located at the concealment position Q. In addition, the front face 230B of the prism 231B is in the light-emitting state to indicate each direction of transferring manipulation on each of the four sides of the four directions of front and rear, right and left of the vehicle corresponding to the four directions of up and down, right and left of the screen 30. In contrast, the front face of the ring portion 23A1 of the prism 231A is in the non-emitting state. That is, the manipulation manner display portion 2308 corresponding to the manipulation manner designated as a valid manipulation manner is displayed in highlight as compared with the manipulation manner display portion 230A corresponding to the manipulation manner designated as an invalid manipulation manner.

Figure 8A:
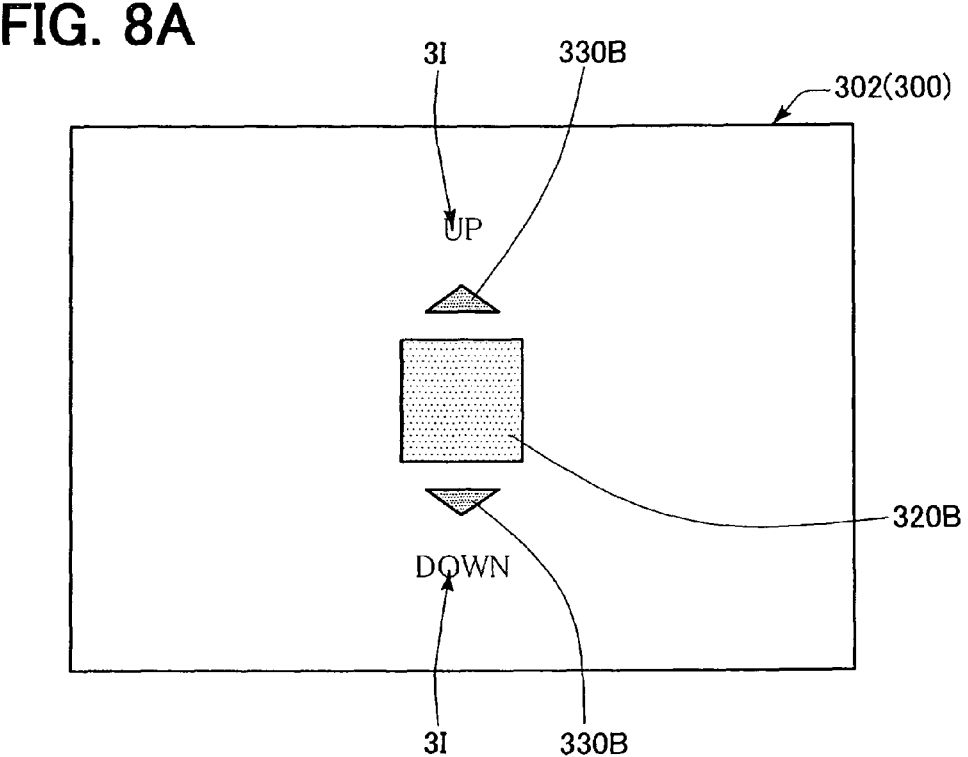
FIG. 8A is a second example of a window in the display device.
Figure 8B:
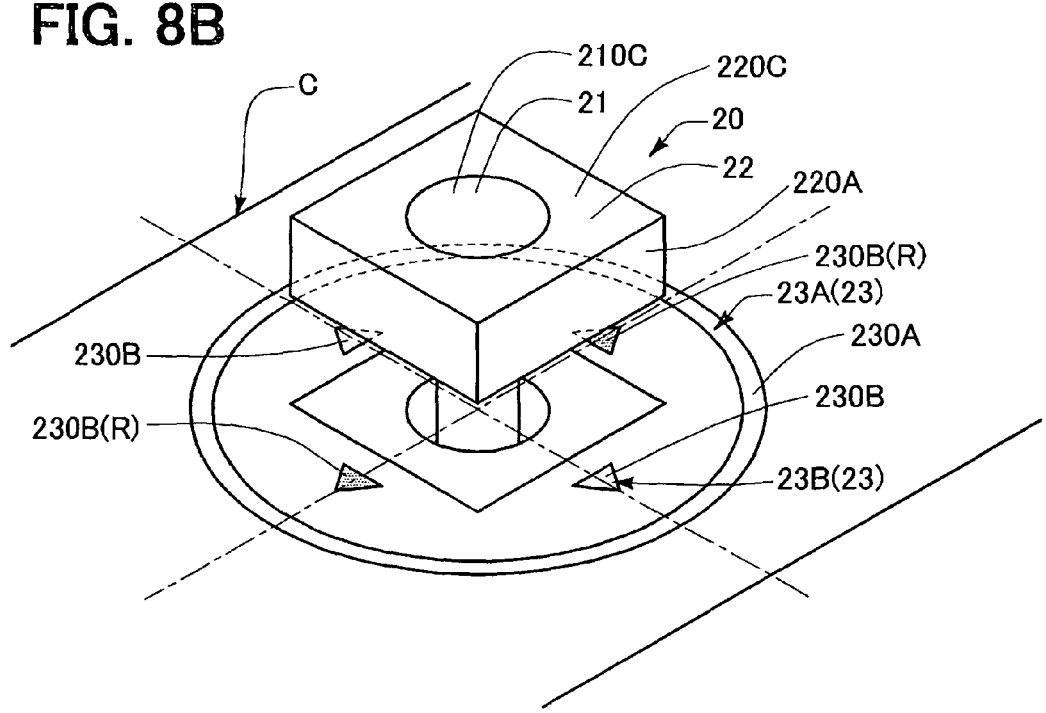
FIG. 8B is an example of a display state in the manipulation device with FIG. 8A displayed.

FIG. 8A shows a display example of the window 302 where the transferring manipulation manner is designated or set up. The two selection regions. (input images) 3I are arranged in two up and down directions out of the four directions of the crisscross. In addition, a manipulation direction image 330B is displayed in a central portion of the window so as to illustrate each of the two directions of transferring manipulation for selecting the selection regions 3I. By displaying the two manipulation direction images 330B, the user can recognize that a manipulation by the transferring manipulation manner is possible, and can further recognize the two directions of transferring manipulation. Further, in FIG. 8A, a graphic image 330B (i.e., a quadrilateral image) is displayed in a center of the manipulation direction images 330B to reflect the tip face shape (herein, the outer edge shape of the transformable portion 22) of the manipulation member 20. In contrast, FIG. 8B is an oblique perspective view illustrating the manipulation device 2 when the window 302 of FIG. 8A is displayed; the transformable portion 22 is located at the concealment position Q. In addition, the front face 230B of the prism 231B is in the light-emitting state to indicate each direction of transferring manipulation on each of the two sides of the two directions of front and rear of the vehicle corresponding to the two directions of up and down of the screen 30. In contrast, the front face 230A of the ring portion 23A1 of the prism 231A and the front face 230B of the prism 231B which shows the direction of transferring manipulation in the non-selection side (in this case, the side on which the selection region 3I does not exist) are in the non-emitting state. That is, in the transferring manipulation manner designated as a valid manipulation manner, the manipulation manner display portion 230B corresponding to the valid direction of transferring manipulation is displayed in highlight as compared with both of (i) the manipulation manner display portion 230B corresponding to the invalid manipulation direction of the transferring manipulation manner and (ii) the manipulation manner display portion 230A corresponding to the rotating manipulation manner designated as an invalid manipulation manner.

Figure 9A:
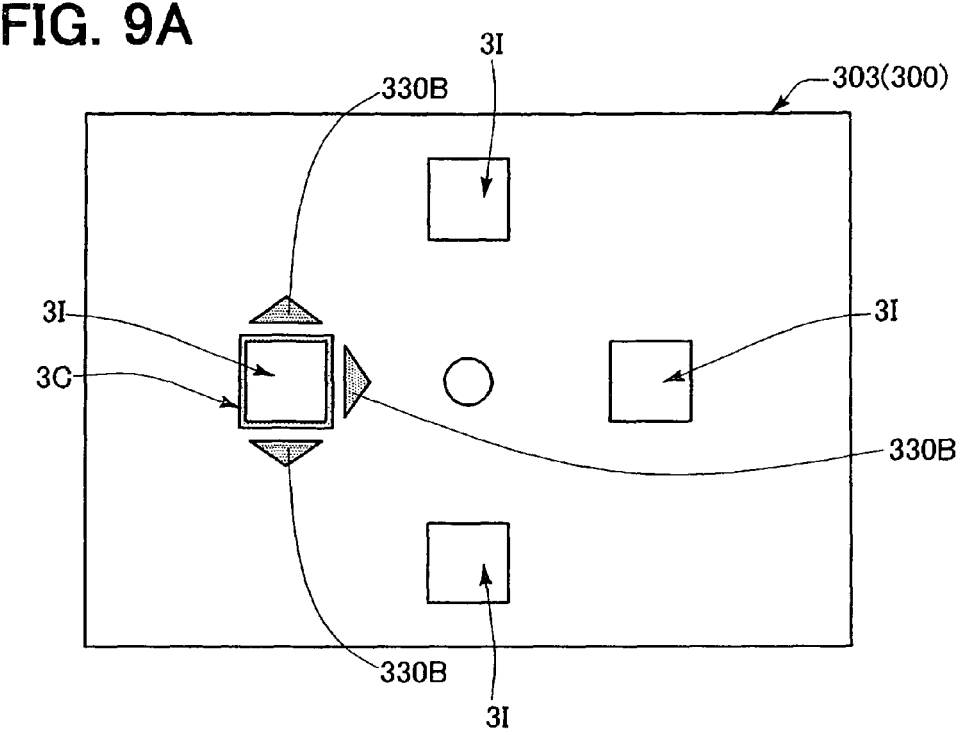
FIG. 9A is a third example of a window in the display device.
Figure 9B:
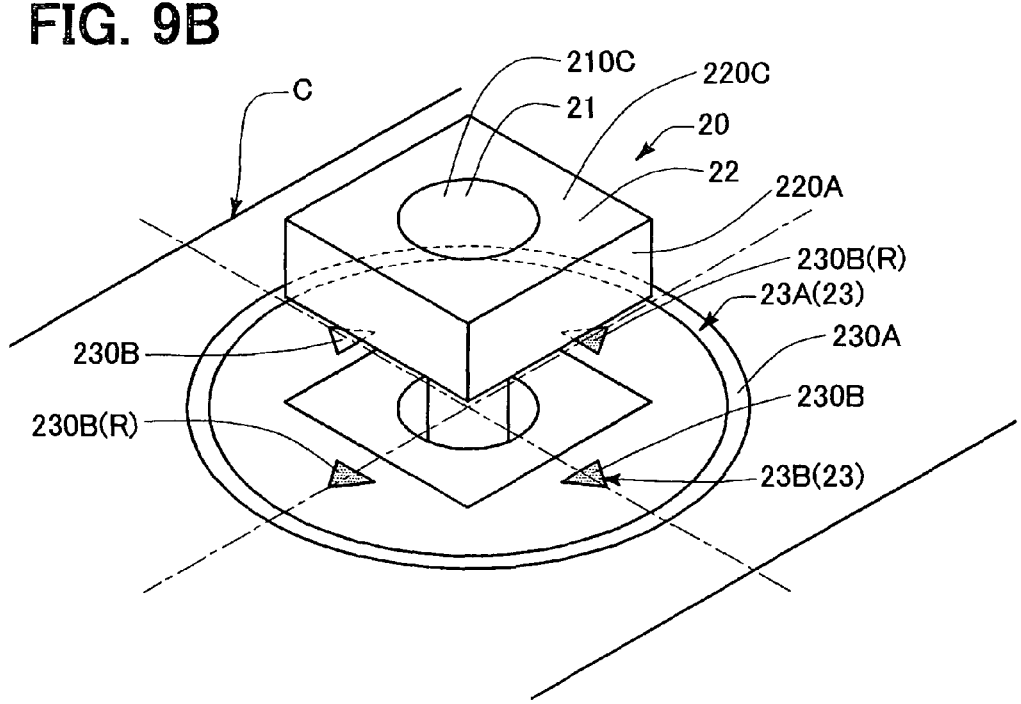
FIG. 9B is an example of a display state in the manipulation device with FIG. 9A displayed.

FIG. 9A shows a display example of the window 303 where the transferring manipulation manner is designated or set up. The selection regions (input images) 3I are arranged in the four directions of the crisscross. One of these selection regions 3I is in the selection state by the cursor 3C. In addition, a manipulation direction image 330B is displayed in the selection region in the selection state by the cursor 3C so at to illustrate each of the three directions of transferring manipulation for selecting the remaining selection regions 3I. By displaying the three manipulation direction images 330B, the user can recognize that a manipulation by the transferring manipulation manner is possible, and can further recognize the three currently valid directions of transferring manipulation. In contrast, FIG. 9B is an oblique perspective view illustrating the manipulation device 2 when the window 303 of FIG. 9A is displayed; the transformable portion 22 is located at the concealment position Q. In addition, the front face 230B of the prism 231B is in the light-emitting state to indicate each of the directions of transferring manipulation on each of the three sides of the three directions of front, rear, and right of the vehicle corresponding to the three directions of up, down, and right of the screen 30. In contrast, the front face 230A of the ring portion 23A1 of the prism 231A and the front face 230B of the prism 231B which shows the direction of transferring manipulation in the non-selection side (in this case, the side on which the selection region 3I does not exist with respect to the selection region 3I in the selection state) are in the non-emitting state. That is, in the transferring manipulation manner designated as a valid manipulation manner, the manipulation manner display portion 230B corresponding to the valid direction of transferring manipulation is displayed in highlight as compared with both of (i) the manipulation manner display portion 230B corresponding to the invalid manipulation direction of the transferring manipulation manner and (ii) the manipulation manner display portion 230A corresponding to the rotating manipulation manner designated as an invalid manipulation manner.

Figure 10A:
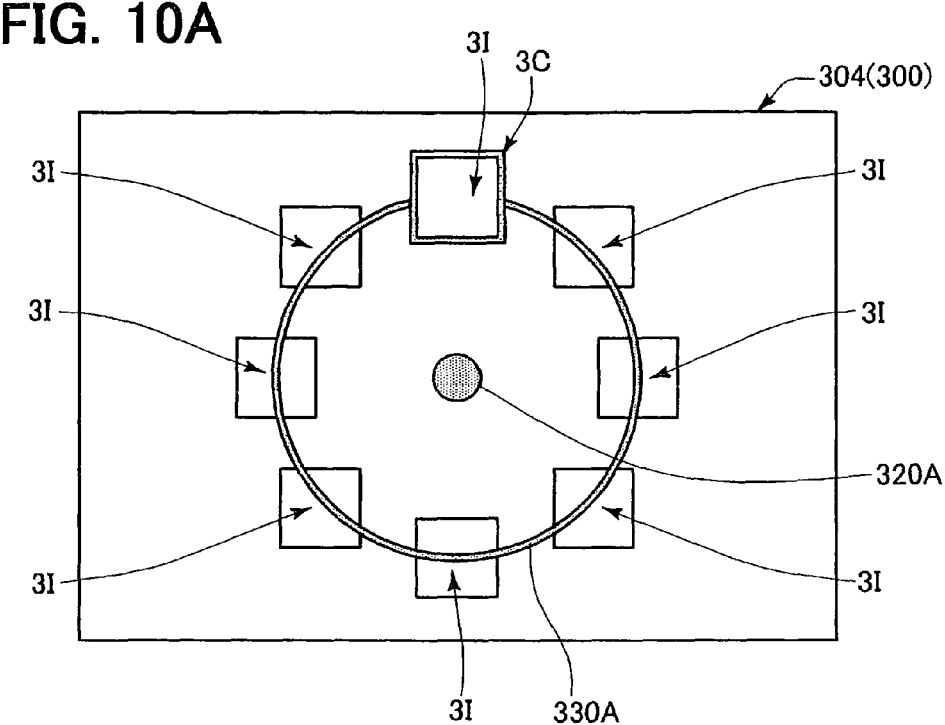
FIG. 10A is a fourth example of a window in the display device.
Figure 10B:
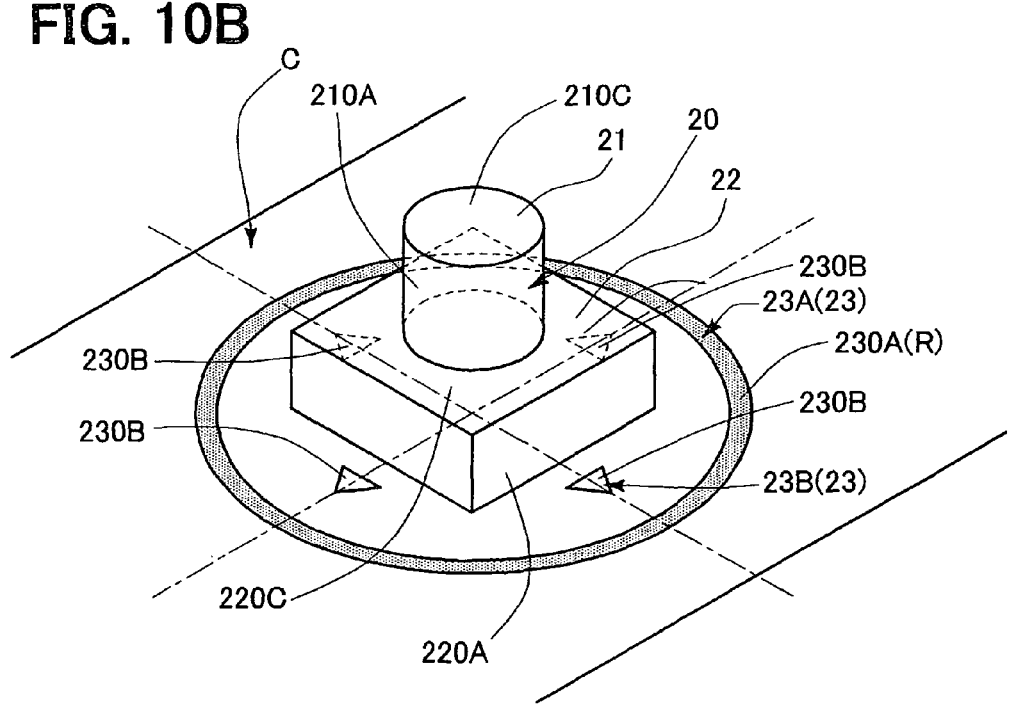
FIG. 10B is an example of a display state in the manipulation device with FIG. 10A displayed.

FIG. 10A shows a display example of the window 304 where the transferring manipulation manner is designated or set up. Several selection regions (input images) 3I are arranged in a ring with predetermined intervals. A manipulation direction image 330A is displayed in a ring so as to connect the selection regions. By displaying the manipulation direction image 330A of the ring, the user can recognize the rotating manipulation manner. Further, in FIG. 10A, a graphic image 320A (i.e., a circular image) is displayed in a center of the circular manipulation direction image 330B to reflect a circular shape of the tip face 210A of the main body portion 21 of the manipulation member 20. Thereby, the shape of the displayed manipulation direction image 330A enables the recognition that the rotating manipulation is possible with respect to the main body portion 21 containing the tip face 210A having a similar shape. It is noted that in the window 304, when the rotating manipulation is made, the position of the cursor is not changed, but the selection region (input image) 3I is rotated. The selection region which newly reaches the position of the cursor becomes in the selection state. In contrast, FIG. 10B is an oblique perspective view illustrating the manipulation device 2 when the window 304 of FIG. 10A is displayed; the transformable portion 22 is located at the exposure position P. In addition, the front face 230A of the ring portion 23A1 of the prism 231A which indicates the rotating manipulation direction is in the light-emitting state. In contrast, the front face 230B of the prism 231B indicates each direction of transferring manipulation on each of the four sides of the four directions of front and rear, right and left of the vehicle corresponding to the four directions of up and down, right and left of the screen 30; such front face 230B of the prism 231 is in the non-emitting state. That is, the manipulation manner display portion 230A corresponding to the manipulation manner designated as a valid manipulation manner is displayed in highlight as compared with the manipulation manner display portion 230B corresponding to the manipulation manner designated as an invalid manipulation manner.

Figure 11A:
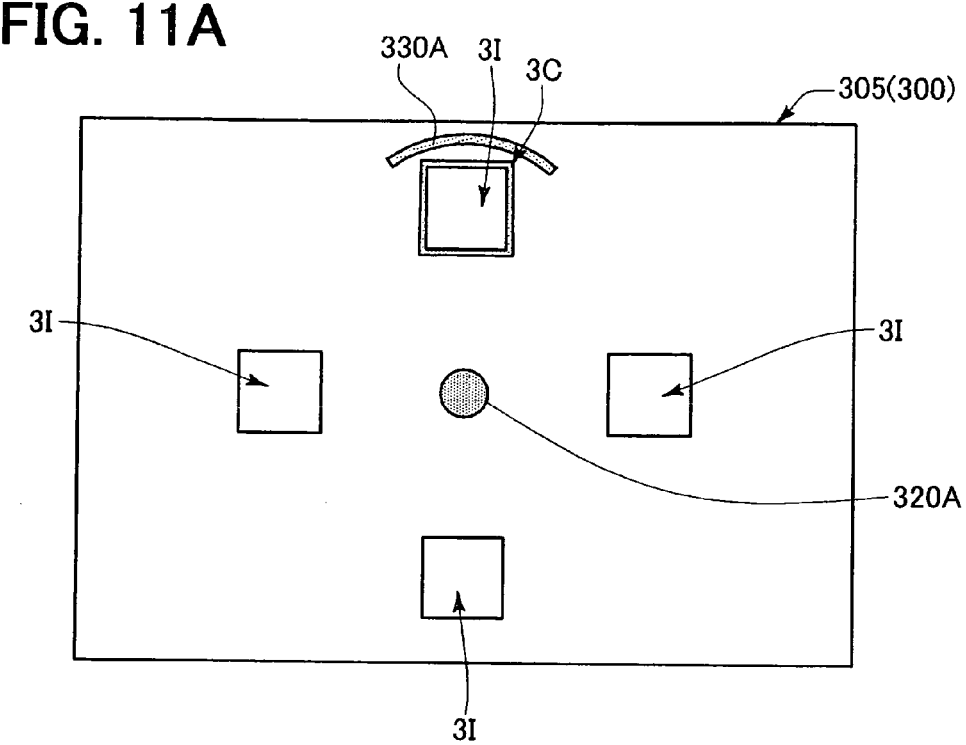
FIG. 11A is a fifth example of a window in the display device.
Figure 11B:
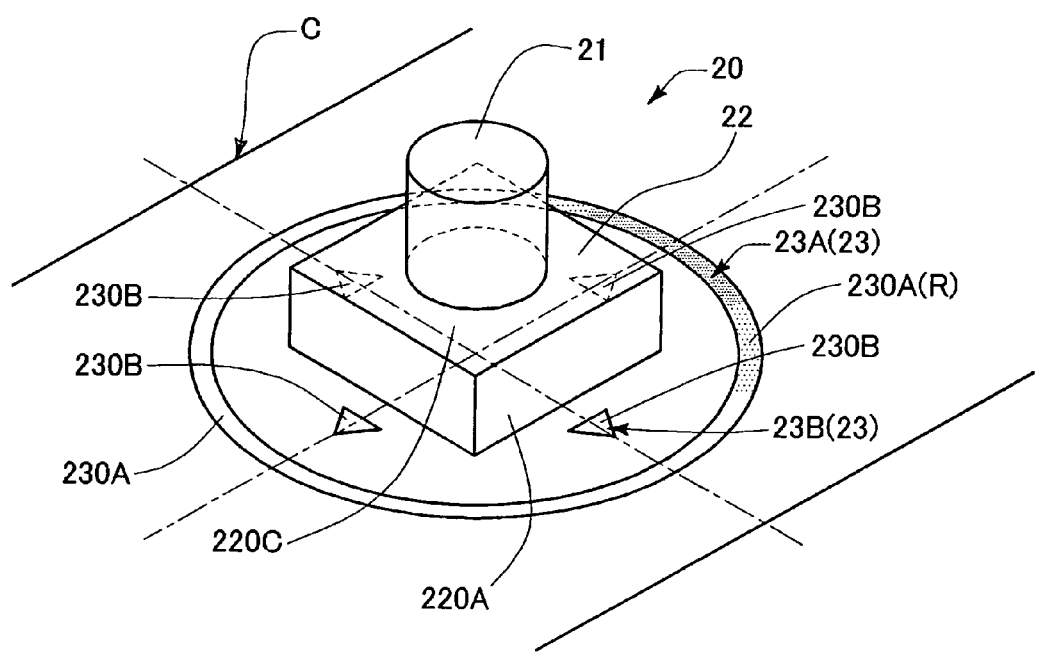
FIG. 11B is an example of a display state in the manipulation device with FIG. 11A displayed.

FIG. 11A shows a display example of the window 305 where the transferring manipulation manner is designated or set up. Several selection regions (input images) 3I are arranged in a ring with predetermined intervals (herein, four directions of up and down, and left and right). One of the selection regions 3I is in the selection state by the cursor 3C. A circular-arc shaped manipulation direction image 330A is arranged near the selection region 3I in the selection state by the cursor 3C, so as to illustrate a rotating manipulation direction for selecting a selection region 3I adjoining in a circle. By displaying the manipulation direction image 330A, the user can recognize that the rotating manipulation manner is designated or set up. Further, in FIG. 11A, a graphic image 320 (herein, a circular image 320A) is displayed in a center side of the circular ark shaped manipulation direction image 330A to reflect a circular shape of the tip face 210A of the main body portion 21 of the manipulation member 20. In contrast, FIG. 11B is an oblique perspective view of a vehicular compartment illustrating the manipulation device 2 when the window 305 of FIG. 11A is displayed; the transformable portion 22 is located at the exposure position P. In addition, in the ring portion 23A1 of the prism 231A indicating the rotating manipulation direction, the front face 230A corresponding to the selection region 3I in the cursor selection state is in the light-emitting state. In contrast, in the ring portion 23A1 of the prism 231A indicating the rotating manipulation direction; (i) the front face 230A corresponding to the selection region 3I in the cursor non-selection state and (ii) the front face 230B of the prism 231B indicating each direction of transferring manipulation on each of the four sides of the four directions of front and rear, right and left of the vehicle corresponding to the four directions of up and down, right and left of the screen 30 are in the non-emitting state. That is, in the rotating manipulation manner designated as a valid manipulation manner, only the light emitting portion 232A corresponding to the position of the cursor 3C is in the light-emitting state, whereas the remaining light emitting portions 232A, 232B are in the non-emitting state.

In FIGS. 7 to 11, (R) is given to the display regions 230A and 230B of the display portion 23 displayed in highlight.

In the above display example, the manipulation manner display image is displayed on the screen 30 of the display device 3 so as to model for the display state in the first display portion 23A and the second display portion 23B. In specific, (i) the display regions 230A, 230B of the display portion 23A and (ii) the manipulation direction images 330A, 330B have shapes similar to each other; in FIG. 7-FIG. 11, they are similar in shape and color.

The manipulation device 2 of the present embodiment is arranged as an auxiliary manipulation portion at a position much closer to a predetermined seat in the vehicle compartment so as to more reduce a user's manipulation load as compared to a main manipulation portion such a touch panel on the screen 30 or mechanical switch arranged close to the screen 30. As shown in FIG. 2, the manipulation device 2 is arranged in a position, which can be manipulated by users who are seated in a driver's seat 2D and a fellow passenger's seat 2P while leaning on backrests of the seats. In specific, the manipulation device 2 is arranged in a region C (herein, a center console) intervening between a vehicular right seat and a vehicular left seat (i.e., the driver's seat 2D and the passenger's seat 2P) of the vehicle. In contrast, as compared with the position of the manipulation device 2, the display device 3 is arranged in a position closer to the front of the vehicle so as to enable the users seated in the respective seats 2D, 2P to see.

The example of the present embodiment is explained in the above; however, such an example is only one example. The present embodiment need not be limited to the above example, and can be varied in various manners based on the knowledge of a person skilled in the art unless deviating from the scope of the claims. The following describes another embodiment.

Figure 13A:
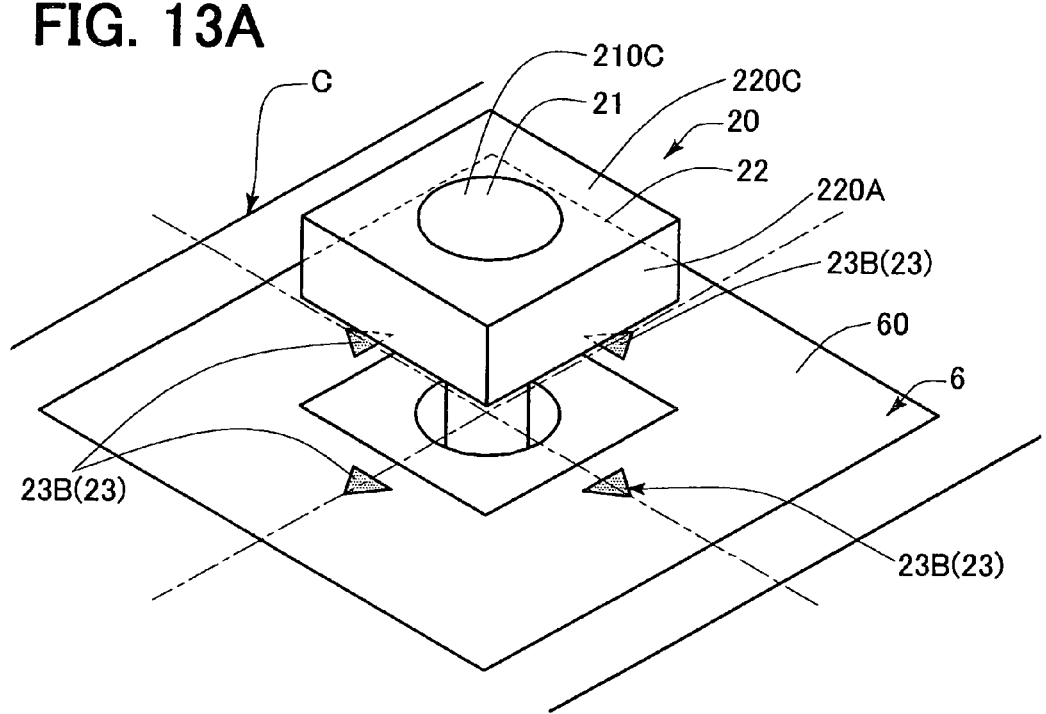
FIG. 13A is an oblique perspective view for explaining a first manipulation manner display portion in a display portion of a manipulation device according to another embodiment.
Figure 13B:
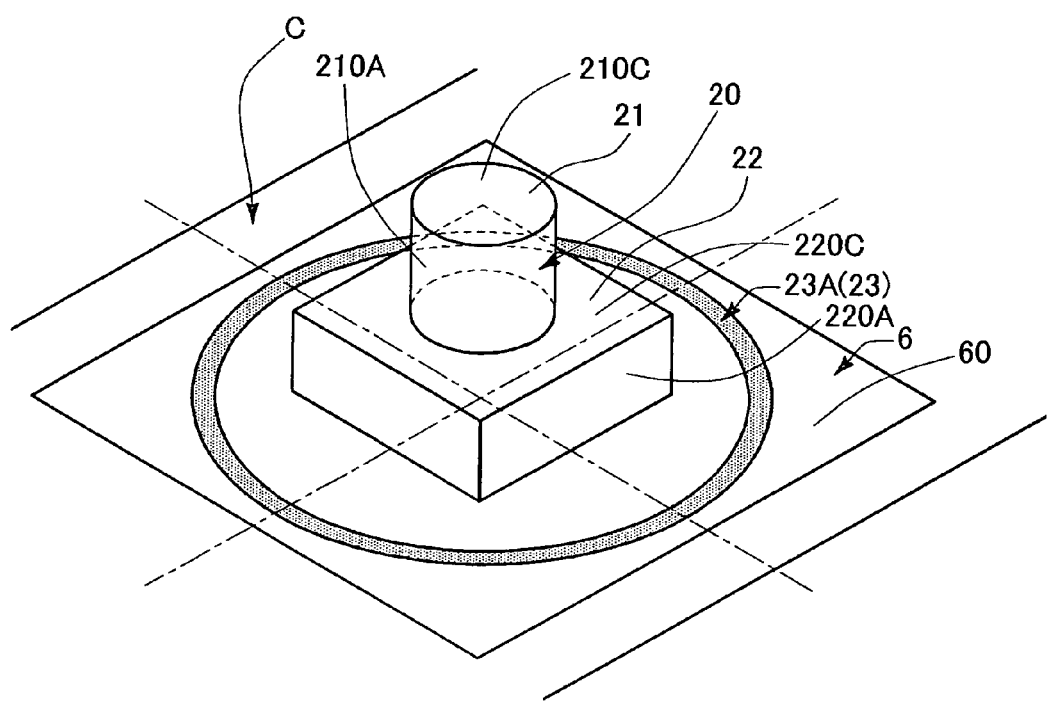
FIG. 13B is an oblique perspective view for explaining a second manipulation manner display portion in a display portion of a manipulation device according to another embodiment.

In the above embodiment, a valid manipulation manner is indicated using the first display portion 23A and the second display portion 23B. Without need to be limited thereto, as illustrated in FIGS. 13A, 13B, in the manipulation device 2, another display device 6 different from the display device 3 may be provided in a front face 200A of the housing 200 surrounding the manipulation member 20 for displaying a manipulation manner on an own screen 60. That is, an image equivalent to a manipulation manner display portion corresponding to the manipulation manner designated as a valid manipulation manner is displayed on the screen 60 of the display device 6 in highlight as compared with images (maybe, unshown) equivalent to the remaining manipulation manner display portion.

Figure 12A:
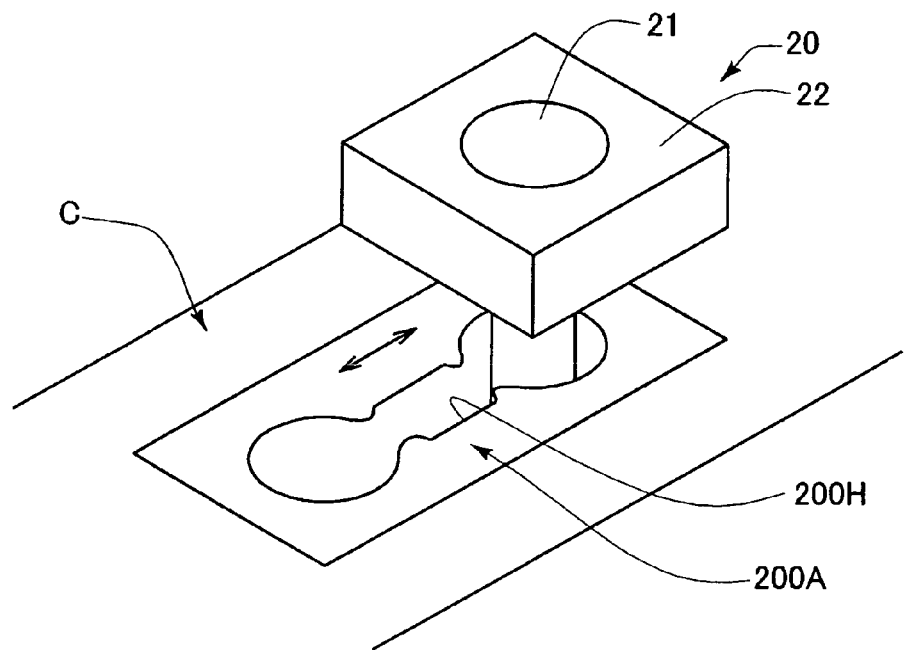
FIG. 12A is an oblique perspective view schematically illustrating a manipulation device that enables a manual setup of a manipulation manner according to another embodiment.
Figure 12B:
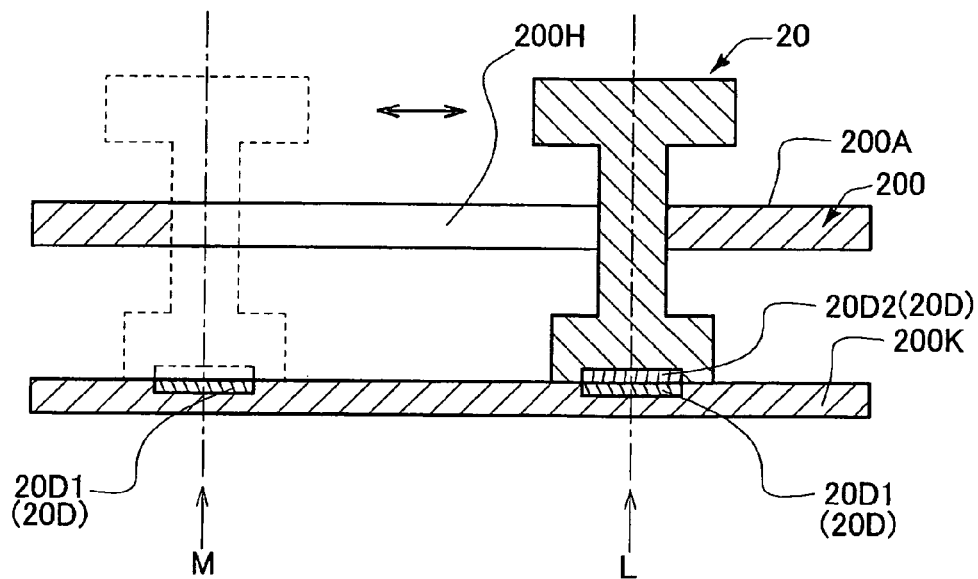
FIG. 12B is a diagram illustrating a central cross-section of the manipulation device of FIG. 12A.

In addition, in the above embodiment, setting a manipulation manner in the valid state is determined according to a display content on the screen 30. Such setting may be made according to a manipulation by a user. Another manipulation manner having a manipulation direction different from that of the above manipulation manners may be provided to the manipulation member 20; thus, a manipulation manner may be determined based on a manipulation by the another manipulation manner. As illustrated in FIGS. 12A, 12B, another manipulation manner may be provided independently of the tilting manipulation manner, the rotating manipulation manner, and the pressing manipulation manner. That is, a manipulation of sliding the whole of the manipulation member 20 may be provided. A position detection portion 20D is provided which detects whether the manipulation member 20 is at a predetermined position on a vehicle forward side or on a vehicle backward side. When the manipulation member 20 is detected at the predetermined position on the vehicle forward side, the control circuit 10 may set the tilting manipulation manner in the valid state while setting the rotating manipulation manner in the invalid state. When the manipulation member 20 is detected at the predetermined position on the vehicle backward side, the control circuit 10 may set the tilting manipulation manner in the invalid state while setting the rotating manipulation manner in the valid state.

The position detection portion 20D includes a metal contact 20D1 provided in each of the above predetermined positions on the substrate 200K and a metal contact 20D2 provided in the manipulation member 20; the predetermined position where both metal contacts are in contact with each other is detected as the present position of the manipulation member 20.

In addition, in the above embodiments, the manipulation member 20 is enabled to execute several manipulation manners such as the tilting manipulation manner, the rotating manipulation manner, and the pressing manipulation manner. Without need to be limited thereto, at least two manipulation manners only need to be provided. Another manipulation manner may be substituted. Further, another manipulation manner may be added.

Figure 14A:
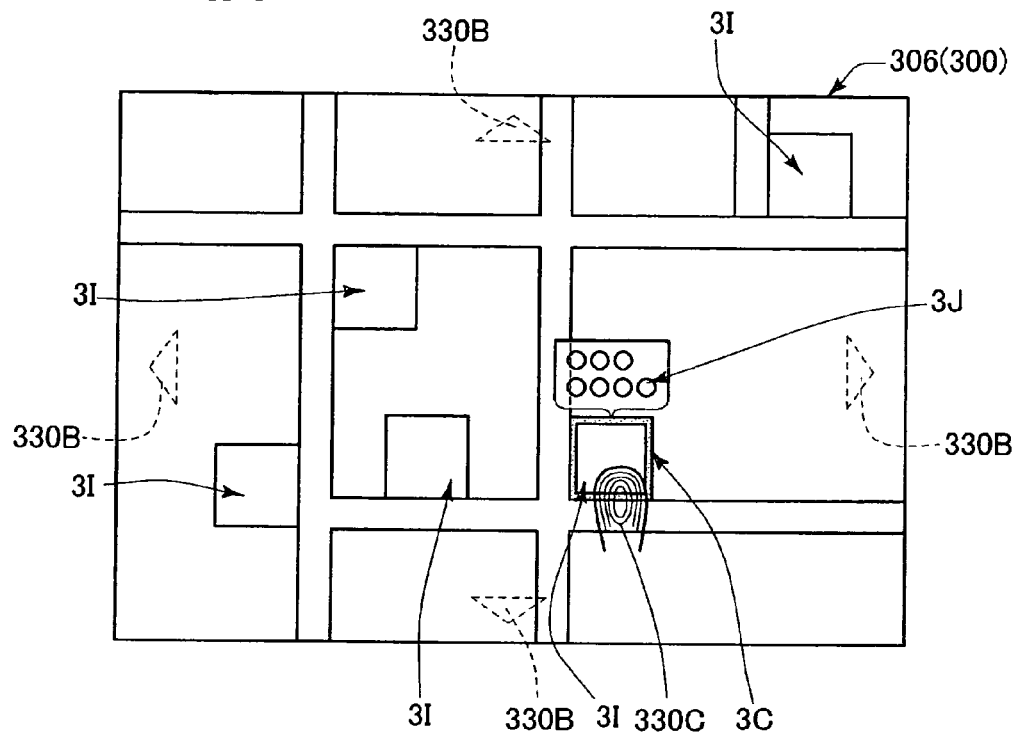
FIG. 14A is an example of a window when adopting a manipulation device of FIG. 14B.
Figure 14B:
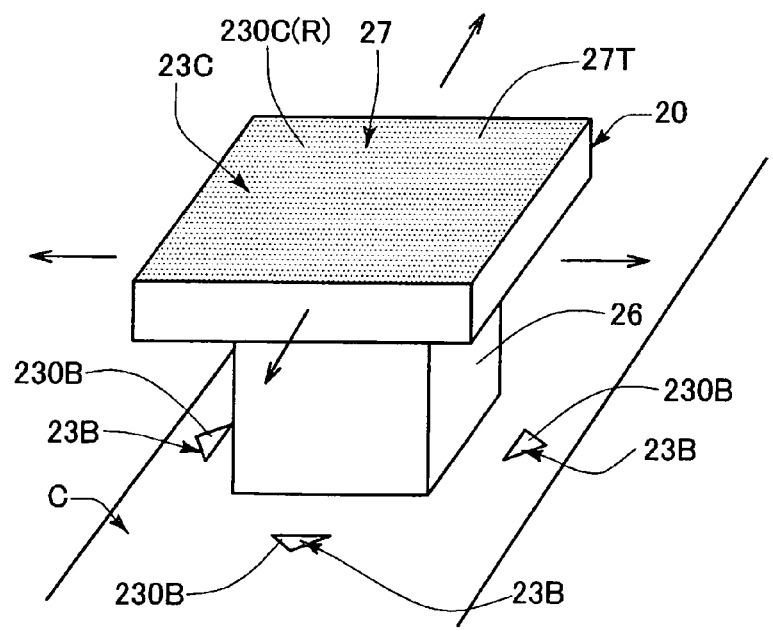
FIG. 14B is an oblique perspective view for explaining a manipulation device according to another embodiment different from the embodiment in FIGS. 3A to 3C.

For example, as illustrated in FIG. 14B, the manipulation member 20 is provided with a main body portion 26 to enable the transferring manipulation manner as explained above, and a touch manipulation portion 27, for instance. The touch manipulation portion 27 is formed as a touch manipulation area such as a touch panel or touchpad arranged on a tip face (upper end face) of the main body portion 26. This can provide a touch manipulation on a two-dimensional face (contact manipulation or sliding manipulation on the touch manipulation area or surface). This enables the display of a window 306 illustrated in FIG. 14A, for instance. The window 306 of FIG. 14A has a map image serving as a background image. The display modes of the window 306 include a scroll mode and a touch input mode. The scroll mode is achieved such that the transferring manipulation manner enables the map image to scroll in up and down, and left and right directions. The touch input mode is achieved such that the touch input manipulation manner to a selection region 3I in the window enables the touched selection region 3I becomes in a selection state by a cursor 3C. The control circuit 10 can designate one of the display modes through switchover. FIG. 14A shows a display state when the touch input mode is set up. In the window 306A, an image 330C is displayed which indicates the touch input manner that is designated as a valid manipulation manner. For instance, when a selection region 3I is selected, corresponding information 3J (e.g., facility information) is displayed. In addition, the image 330C is a fingertip image that indicates a touch input manner. In contrast, when the scroll mode is set up, an image 330B (here, the manipulation direction image mentioned above) appears which indicates the transferring manipulation manner set up in the valid state. In contrast, in the manipulation device 2, when the touch input mode is set up, the touch manipulation area (ornament display portion 23C) of the touch manipulation portion 27 is in the light-emitting state to highlight a touch area, thereby indicating the touch input manner. When the scroll mode is set up, the front face 230B (ornament display portion 23B) of the prism 231B indicating the transferring manipulation direction is in the light-emitting state like in the above embodiment.

Figure 15A:
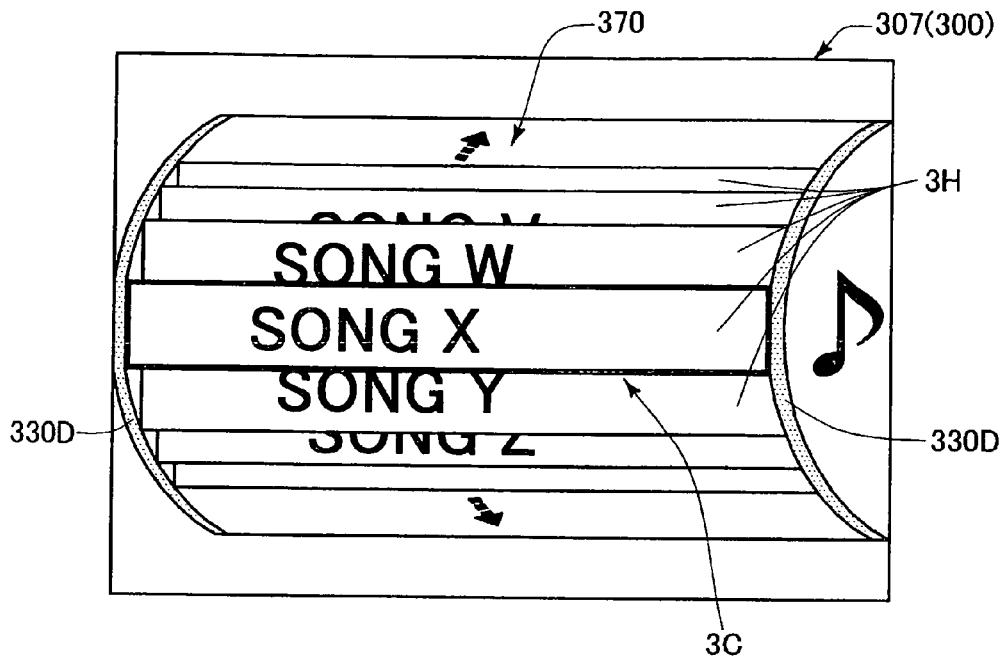
FIG. 15A is an example of a window when adopting a manipulation device of FIG. 15B.
Figure 15B:
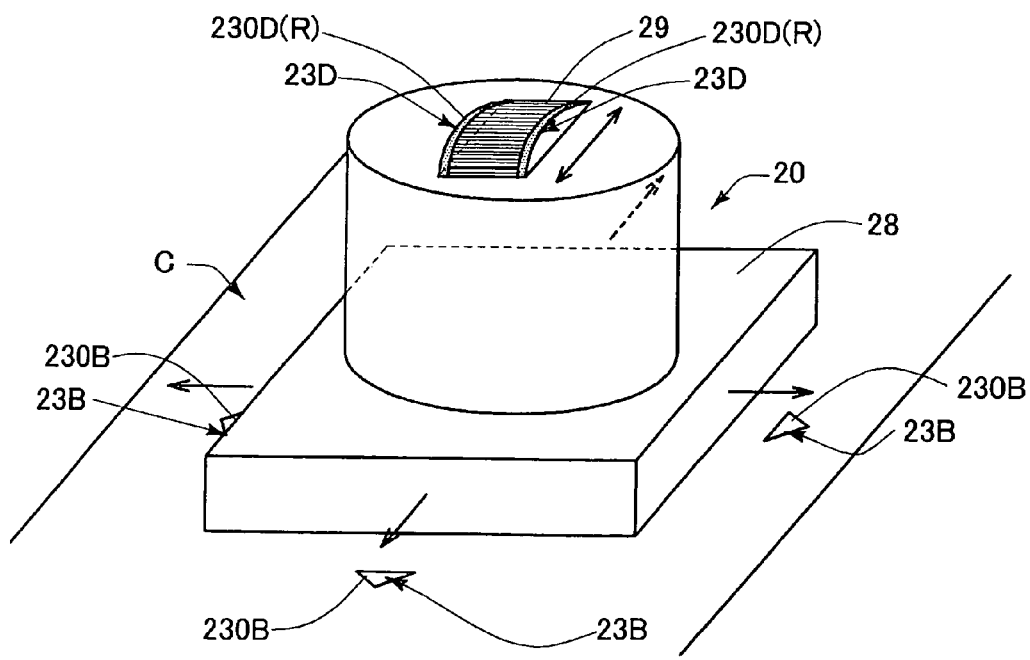
FIG. 15B is an oblique perspective view for explaining a manipulation device according to another embodiment different from the embodiment in FIGS. 3A to 3C and FIG. 14B.

Further, in a manipulation member 20 shown in FIG. 15B, the main body portion 28 enabling a transferring manipulation manner is provided with a wheel member 29 for scroll manipulation, enabling another rotating manipulation different in rotation direction from the above mentioned rotating manipulation. In such a case, a window 307 is displayed as shown in FIG. 15A, setting the rotating manipulation manner (i.e., scroll manipulation manner) in the valid state. A scroll display image 370 is displayed in the window 307 of FIG. 15A. In the scroll display image 370, images 3H used as a selection target is arranged in the predetermined scroll direction. Out of them, the image 3H located in a predetermined position (here, in a middle in the window) is in the selection state by the cursor 3C. Rotating manipulation to the wheel member 29 in the forward direction or opposite direction enables the movement in the forward direction or opposite direction of the images 3H arranged in the scroll direction. The image 3H in the selection state can be changed one by one. The scroll display image 370 is a stereographic image expressing a bottom end of a cylindrical member as if looking at the wheel member 29 from an angle. When the rotating manipulation manner (i.e., scroll manipulation manner) is in the valid state, a circular arc portion 330D of the circumference of each bottom end is displayed in the light-emitting state. This configuration can indicate the rotating manipulation manner (i.e., scroll manipulation manner), the wheel member 29 as the manipulation target, and the manipulation direction. In contrast, in the manipulation device 2, so as to correspond, to the display in the window 307 (so as to appear similarly), the following configuration is provided. The wheel member 29 protruding from the main body portion 28 is provided with a circular prism in a width-direction end. The front face 230D (ornament display portion 23D) of the circular prism is in the light-emitting state. This configuration can indicate the rotating manipulation manner (i.e., scroll manipulation manner), the wheel member 29 as the manipulation target, and the manipulation direction so as to meet with the content of the window.

Figure 16:
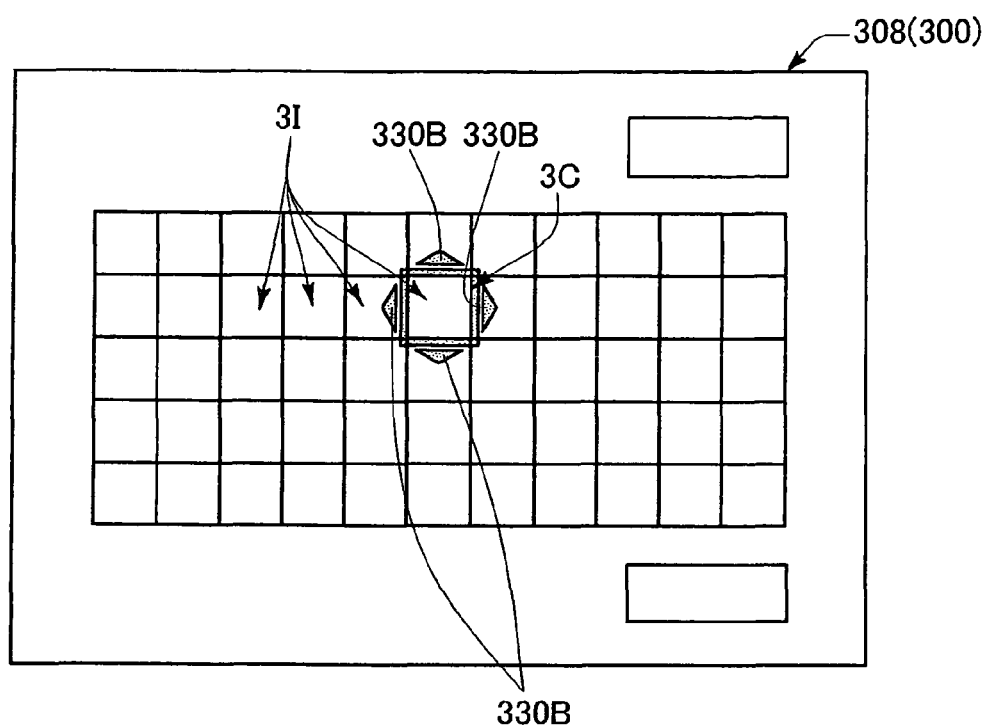
FIG. 16 is another example of a window.

In addition, FIG. 16 is an example of a window in which the same manipulation manner as that in FIG. 7A, for instance; In the window 308 in FIG. 16, several selection regions are arranged, for instance, as an alphabetical character input window. One selection region 3I is in the selection state by the cursor 3C. A selection manipulation is enabled which changes the cursor 3C to another adjoining selection region 3I using the transferring manipulation manner. Four manipulation direction images 330B are displayed in superimposition on the neighboring selection regions so as to indicate the transferring manipulation manner and the direction of transferring manipulation. Such manipulation direction images enable the recognition of the transferring manipulation manner being set up in the valid state, and the transferring manipulation direction (allowable manipulation direction).

In addition, in the manipulation device 2 in the above embodiment, the manipulation direction of the transferring manipulation includes four directions of the shape of a crisscross. Without need to be limited thereto, for example, less than four directions such as two directions, or more than four directions such as eight or six directions may be adopted. Even in such a case, it is preferable that those directions may be extended radially with identical intervals. In the selection-use window 300, the selection regions 3I need to be arranged so as to meet the manipulation directions and the number of the manipulation directions in the manipulation device 2.

Furthermore, the software section or any combinations of multiple software sections can be included in a software program, which can be contained in a non-transitory computer-readable storage media or can be downloaded via a communications network and then stored in a non-transitory computer-readable storage media.

Aspects of the disclosure described herein are set out in the following clauses.

As an aspect of the disclosure, a vehicular manipulation input apparatus in a vehicle is provided as follows. A display device is included to display a window on a screen. A composite manipulation device is included to contain a manipulation member, to which a manipulation is enabled by a first manipulation manner and a second manipulation manner, the first manipulation manner being different from the second manipulation manner in respect of a manipulation direction, the manipulation to the manipulation member enabling a remote manipulation input to the window displayed on the screen of the display device. A manipulation manner designation section is included to designate a valid manipulation manner that is one of the first manipulation manner and the second manipulation manner, whichever is in a valid state in the composite manipulation device according to the window on the screen of the display device. A manipulation manner display portion is included to be arranged in at least one of the manipulation member and a periphery of the manipulation member, the manipulation manner display portion containing a first display portion that suggests the first manipulation manner and a second display portion that suggests the second manipulation manner. A primary display control section is included to cause the display device to execute a display that suggests the valid manipulation manner. An auxiliary display control section is included to highlight, in display, one of the first display portion and the second display portion, whichever corresponds to the valid manipulation manner designated by the manipulation manner designation section, more than an other of the first display portion and the second display portion, whichever does not correspond to the valid manipulation manner designated by the manipulation manner designation section.

As an optional aspect of the disclosure, the vehicular manipulation input apparatus may further include a restriction portion to restrict a manipulation of one of the first manipulation manner and the second manipulation manner, whichever is different from the valid manipulation manner designated by the manipulation manner designation section.

This can help prevent the manipulation manner being not in the valid state from being mistakenly manipulated.

Yet, further, in the vehicular manipulation input apparatus, the manipulation member may include a main body portion and a transformable portion. The transformable portion may be transformable between a predetermined first state and a predetermined second state. When the transformable portion is in the first state, a manipulation of the first manipulation manner may be permitted while a manipulation of the second manipulation manner is restricted. When the transformable portion is in the second state, a manipulation of the second manipulation manner may be permitted while a manipulation of the first manipulation manner is restricted. The restriction portion may cause the transformable portion to be in the first state when the valid manipulation manner is the first manipulation manner, whereas the restriction portion may cause the transformable portion to be in the second state when the valid manipulation manner is the second manipulation manner.

Yet further, in the vehicular manipulation input apparatus, the transformable portion may be reciprocally moved between a predetermined first position and a predetermined second position with respect to the main body portion in the manipulation member. When the transformable portion is in the first position, a manipulation of the first manipulation manner may be permitted while a manipulation of the second manipulation manner is restricted. When the transformable portion is in the second position, a manipulation of the second manipulation manner may be permitted while a manipulation of the first manipulation manner is restricted. The restriction portion may move the transformable portion to the first position when the valid manipulation manner switches over to the first manipulation manner, whereas the restriction portion may move the transformable portion to the second position when the valid manipulation manner switches over to the second manipulation manner.

Thereby, the restriction of the manipulation can be achieved only by the reciprocal movement of the transformable portion.

Further, in the vehicular manipulation input apparatus, the first manipulation manner may be a rotating manipulation manner in which the manipulation member is rotated around a predetermined rotation axis (z).

As an optional aspect of the disclosure, in the vehicular manipulation input apparatus, the second manipulation manner may be a transferring manipulation manner in which the manipulation member may be transferred in a direction orthogonal to a predetermined reference axis (Z) from a reference position where the reference axis accords with a specified axis (z) assigned to the manipulation member.

As an optional aspect of the disclosure, in the vehicular manipulation input apparatus, the first manipulation manner may be a rotating manipulation manner in which the manipulation member is rotated around a predetermined rotation axis (z); the second manipulation manner may be a transferring manipulation manner in which the manipulation member is transferred in a direction orthogonal to a predetermined reference axis (Z) from a reference position where the reference axis accords with a specified axis (z) assigned to the manipulation member; the transferring manipulation manner may be a tilting manipulation manner in which the manipulation member is tilted in the direction orthogonal to the reference axis from the reference position where the reference axis accords with the rotation axis serving as the specified axis; the manipulation device may include a housing in addition to the manipulation member; the manipulation member may include a main body portion and a transformable portion; the manipulation member containing the main body portion and the transformable portion may protrude towards an outside of the housing from a hole portion that penetrates inside of the housing; the main body portion may be enabled to rotate based on the rotating manipulation manner around a direction of penetrating that accords with the rotation axis; the transformable may be provided in a non-rotation state with respect to the housing while permitting the main body portion to rotate around the rotation axis; the transformable portion may be reciprocally movable between a concealment position and an exposure position; at the concealment position, the transformable portion may surround a protruding tip portion of the main body portion to conceal an outer circumference face; at the exposure position, the transformable portion may be moved from the concealment position towards the housing to expose the outer circumference face of the protruding tip portion; when the transformable portion is at the concealment position, a spacing may be provided between a front face of the housing and the transformable portion, permitting a tilting manipulation of the manipulation member; when the transformable portion is at the exposure position, a flat face of the transformable portion and a front face of the housing are in contact with each other, restricting a tilting manipulation of the manipulation member; a restriction portion may be included to be configured to restrict a manipulation of one of the first manipulation manner and the second manipulation manner, whichever is different from the valid manipulation manner designated by the manipulation manner designation section; the restriction portion may include a drive portion and a drive control section; the drive portion may move the transformable portion between the concealment position and the exposure position; and the restriction portion may cause the drive portion to move the transformable portion to the exposure position when the valid manipulation manner switches over to the first manipulation manner, whereas the restriction portion may cause the drive portion to move the transformable portion to the concealment position when the valid manipulation manner switches over to the second manipulation manner.

In such a configuration, when the transformable portion is at the concealment position, the protruding tip portion of the main body portion is surrounded from an outer circumference side to conceal the outer circumference face. Thus, a grip portion to perform a rotating manipulation is not exposed, thereby disabling the rotating manipulation mechanically or physically. In addition, when the transformable portion is at the concealment position, there is existing a spacing or gap between the transformable portion and a front face of the housing, enabling the tilting manipulation of the manipulation member. In contrast, when the transformable portion is at the exposure position, the outer circumference face of the protruding tip portion of the main body portion is exposed; using the outer circumference face as a grip, the rotating manipulation can be executed. In addition, when the transformable portion is at the exposure position, the transformable portion and the front face of the housing contact without spacing, thereby disabling the tilting manipulation of the manipulation member.

In the above vehicular manipulation input apparatus, in the tilting manipulation manner, the rotation axis of the manipulation member may be permitted to tilt from the reference position, where the rotation axis accords with the reference axis, in one of at least three specified directions; a tip face of the protruding tip portion of the main body portion may be shaped of a circle orthogonal to the rotation axis; and an outer edge of the transformable portion may be shaped of a polygon having sides in the at least three specified directions.

The tip face of the main body portion gripped in the rotating manipulation can be always viewable from an outside. The tip face shaped of a circle can indicate a manipulation movement locus of the rotating manipulation. The rotating manipulation manner can be thus easily suggested, contributing to the easy association with the rotating manipulation manner. In contrast, the transformable portion is gripped when the transferring manipulation is made. When the outer edge of the transformable portion is shaped of a polygon having sides orthogonal to the manipulation directions enabled in the transferring manipulation. The transferring manipulation manner can be thus easily suggested, contributing to the easy association with the transferring manipulation manner and the transferring manipulation directions.

Yet further, in the above vehicular manipulation input apparatus, the transformable portion may include a fitting hole portion which fits with the main body portion at the concealment position so as to conceal, from an outside, all faces of the main body portion expect for a tip face.

Thus, even the transformable portion is at the concealment position, the tip face of the main body portion is still exposed. If the tip face has a shape to suggest the manipulation manner applied to the main body portion, the manipulation manner enabled when the transformable portion is at the exposure position may be associated easily.

As an optional aspect of the disclosure, in the vehicular manipulation input apparatus, the primary display control section may display on the screen a manipulation direction display image that models for a display state of the manipulation manner display portion.

If an image matching with a highlight display in the manipulation manner display portion is displayed on the screen of the display device, the association of the both can become more clear, enabling the user to easily recognize the manipulation manner and manipulation direction.

As an optional aspect of the disclosure, in the vehicular manipulation input apparatus: the composite manipulation device may further include in addition to the manipulation member a housing and an auxiliary display device, which is different from the display device and arranged in a front face of the housing around the manipulation member for a manipulation manner display; and the auxiliary display control section may highlight, on a screen of the auxiliary display device, a display area corresponding to one of the first manipulation manner and the second manipulation manner, whichever is the valid manipulation manner designated by the manipulation manner designation section, more than a display portion corresponding to an other of the first manipulation manner and the second manipulation manner, whichever is not the valid manipulation manner designated by the manipulation manner designation section.

The flexibility of the manipulation manner display in the manipulation member becomes high. That is, this enables a display to attract an attention, and to have an originality in design. In addition, the auxiliary display device in the composite manipulation device can display an image similar to the image to suggest the manipulation manner in the screen of the display device. The association of the both can become more clear, enabling the user to intuitively recognize the manipulation manner and manipulation direction.

It will be obvious to those skilled in the art that various changes may be made in the above-described embodiments of the present invention. However, the scope of the present invention should be determined by the following claims.

What is claimed:

1. A vehicular manipulation input apparatus in a vehicle, comprising:
   a central processing unit;
   a display device that displays a window on a screen;
   a composite manipulation device including a manipulation member, to which a manipulation is enabled by a first manipulation manner and a second manipulation manner, the first manipulation manner being different from the second manipulation manner in respect of a manipulation direction, the manipulation to the manipulation member enabling a remote manipulation input to the window displayed on the screen of the display device; wherein
   the manipulation member comprises a main body portion and a transformable portion;
   the transformable portion is transformable between a first state and a second state;
   when the transformable portion is in the first state, a manipulation of the first manipulation manner is permitted while a manipulation of the second manipulation manner is restricted;
   when the transformable portion is in the second state, a manipulation of the second manipulation manner is permitted while a manipulation of the first manipulation manner is restricted; the vehicular manipulation input apparatus further comprising:
   a manipulation manner designation section configured to designate a valid manipulation manner that is one of the first manipulation manner and the second manipulation manner, whichever is in a valid state in the composite manipulation device according to the window on the screen of the display device;
   a manipulation manner display portion arranged in at least one of the manipulation member and a periphery of the manipulation member, the manipulation manner display portion containing a first display portion that suggests the first manipulation manner and a second display portion that suggests the second manipulation manner;
   a primary display control section configured to cause the display device to execute a display that suggests the valid manipulation manner;
   an auxiliary display control section configured to highlight one of the first display portion and the second display portion, whichever corresponds to the valid manipulation manner designated by the manipulation manner designation section, more than an other of the first display portion and the second display portion, whichever does not correspond to the valid manipulation manner designated by the manipulation manner designation section; and
   a restriction portion configured to restrict a manipulation of one of the first manipulation manner and the second manipulation manner, whichever is different from the valid manipulation manner designated by the manipulation manner designation section;
   wherein the first manipulation manner is a rotating manipulation manner in which the manipulation member is rotated around a rotation axis;
   the second manipulation manner is a tilting manipulation manner in which the manipulation member is tilted in a direction orthogonal to a reference axis from a reference position where the reference axis accords with a the rotation axis of the first manipulation member; the composite manipulation device includes a housing in addition to the manipulation member;
   the manipulation member containing the main body portion and the transformable portion protrudes towards an outside of the housing from a hole portion that penetrates inside of the housing in a protruding direction;
   the main body portion is enabled to rotate based on the rotating manipulation manner around the protruding direction that accords with the rotation axis:
   the transformable portion is provided in a non-rotation state with respect to the housing while permitting the main body portion to rotate around the rotation axis;
   the transformable portion is reciprocally movable between a concealment position and an exposure position;
   at the concealment position, the transformable portion surrounds a protruding tip portion of the main body portion to conceal an outer circumference face of the protruding tip portion;
   at the exposure position, the transformable portion is moved from the concealment position towards the housing to expose the outer circumference face of the protruding tip portion;
   when the transformable portion is at the concealment position, a spacing is provided between a front face of the housing and the transformable portion, permitting a tilting manipulation of the manipulation member;

when the transformable portion is at the exposure position, a flat face of the transformable portion and a front face of the housing are in contact with each other, restricting the tilting manipulation of the manipulation member;

the restriction portion includes a drive portion and a drive control section;

the drive portion moves the transformable portion between the concealment position being the second state and the exposure position being the first state; and the restriction portion causes the drive portion to move the transformable portion to the exposure position when the valid manipulation manner switches over to the first manipulation manner, whereas the restriction portion causes the drive portion to move the transformable portion to the concealment position when the valid manipulation manner switches over to the second manipulation manner.

2. The vehicular manipulation input apparatus according to claim 1, wherein:

in the tilting manipulation manner, the rotation axis of the manipulation member is permitted to tilt from the reference position, where the rotation axis accords with the reference axis, in one of at least three specified directions;

a tip face of the protruding tip portion of the main body portion is shaped of a circle orthogonal to the rotation axis; and an outer edge of the transformable portion is shaped of a polygon having sides in the at least three specified directions.

3. The vehicular manipulation input apparatus according to claim 2, wherein the transformable portion includes a fitting hole portion which fits with the main body portion at the concealment position so as to conceal, from an outside, all faces of the main body portion expect for a tip face.

4. The vehicular manipulation input apparatus according to claim 1, wherein the primary display control section displays on the screen a manipulation direction display image that models for a display state of the manipulation manner display portion.

5. The vehicular manipulation input apparatus according to claim 1, wherein:

the composite manipulation device further includes in addition to the manipulation member a housing and an auxiliary display device, which is different from the display device and arranged in a front face of the housing around the manipulation member for a manipulation manner display; and the auxiliary display control section highlights, on a screen of the auxiliary display device, a display area corresponding to one of the first manipulation manner and the second manipulation manner, whichever is the valid manipulation manner designated by the manipulation manner designation section, more than a display portion corresponding to an other of the first manipulation manner and the second manipulation manner, whichever is not the valid manipulation manner designated by the manipulation manner designation section.

6. The vehicular manipulation input apparatus according to claim 1, wherein the drive portion moves the transformable portion reciprocally between the concealment position and the exposure position while a positional relation between the housing and the main body portion is unchanged.

7. A vehicular manipulation input apparatus comprising:
a central processing unit;
a display device that displays a window on a screen;
a composite manipulation device including a housing and a manipulation member, whose manipulation permits a remote manipulation input to the window on the screen, the manipulation being made by a rotating manipulation manner and a tilting manipulation manner, the rotating manipulation manner in which the manipulation member is rotated around a predetermined rotation axis, the tilting manipulation manner in which the manipulation member is tilted in a direction orthogonal to a reference axis from a reference position where the reference axis accords with the rotation axis of the manipulation member;

a manipulation manner designation section that designates a valid manipulation manner that is either the rotating manipulation manner or the tilting manipulation manner, whichever is in a valid state in the composite manipulation device according to the window on the screen; and a restriction portion that restricts a manipulation of either the rotating manipulation manner or the tilting manipulation manner, whichever is different from the valid manipulation manner, wherein:

the manipulation member protrudes towards an outside of the housing from a hole portion that penetrates inside of the housing;

the manipulation member includes a main body portion and a transformable portion, the main body portion being rotated based on the rotating manipulation manner around the rotation axis, the transformable portion being in a non-rotation state with respect to the housing;

the transformable portion is reciprocally movable between a concealment position and an exposure position;

at the concealment position, the transformable portion surrounds a protruding tip portion of the main body portion to conceal an outer circumference face, and a spacing is provided between a front face of the housing and the transformable portion, permitting a manipulation of the tilting manipulation manner while restricting a manipulation of the rotating manipulation manner; and at the exposure position, the transformable portion is moved from the concealment position towards the housing to expose the outer circumference face of the protruding tip portion, and a flat face of the transformable portion and a front face of the housing are in contact with each other, restricting a manipulation of the tilting manipulation manner while permitting a manipulation of the rotating manner;

the restriction portion includes a drive portion and a drive control section;

the drive portion moves the transformable portion reciprocally between the concealment position and the exposure position; and the restriction portion causes the drive portion to move the transformable portion to the exposure position when the valid manipulation manner switches over to the rotating manipulation manner, whereas the restriction portion causes the drive portion to move the transformable portion to the concealment position when the valid manipulation manner switches over to the tilting manipulation manner.

8. The vehicular manipulation input apparatus according to claim 7,
wherein the drive portion moves the transformable portion reciprocally between the concealment position and the exposure position while a positional relation between the housing and the main body portion is unchanged.

9. The vehicular manipulation input apparatus according to claim 8, further comprising:
a manipulation manner display portion arranged in at least one of the manipulation member and a periphery of the manipulation member, the manipulation manner display portion containing a first display portion that suggests the rotating manipulation manner and a second display portion that suggests the tilting manipulation manner;
a primary display control section configured to cause the display device to execute a display that suggests the valid manipulation manner; and
an auxiliary display control section configured to highlight, in display, one of the first display portion and the second display portion, whichever corresponds to the valid manipulation manner designated by the manipulation manner designation section, more than an other of the first display portion and the second display portion, whichever does not correspond to the valid manipulation manner designated by the manipulation manner designation section.

* * * * *